June 7, 1966 J. W. AQUADRO ETAL 3,254,728

AUTOMATIC BATCH WEIGHER USING DIGITAL COUNT-DOWN CONTROL SYSTEM

Filed March 11, 1964 17 Sheets-Sheet 1

INVENTORS
JOHN W. AQUADRO
GILBERT A. GODWIN

BY Norris & Bateman

ATTORNEYS

INVENTORS
JOHN W. AQUADRO
GILBERT A GODWIN
BY Norris & Bateman
ATTORNEYS

INVENTOR
JOHN W. AQUADRO
and
GILBERT A. GODWIN

BY Norris & Bateman
ATTORNEYS

June 7, 1966 J. W. AQUADRO ETAL 3,254,728

AUTOMATIC BATCH WEIGHER USING DIGITAL COUNT-DOWN CONTROL SYSTEM

Filed March 11, 1964 17 Sheets-Sheet 4

INVENTOR

JOHN W. AQUADRO and GILBERT A. GODWIN

BY

Norris & Bateman

ATTORNEYS

INVENTOR
JOHN W. AQUADRO
and
GILBERT A. GODWIN
BY
Norris & Bateman
ATTORNEYS

June 7, 1966 J. W. AQUADRO ETAL 3,254,728

AUTOMATIC BATCH WEIGHER USING DIGITAL COUNT-DOWN CONTROL SYSTEM

Filed March 11, 1964 17 Sheets-Sheet 6

INVENTOR

JOHN W. AQUADRO and

GILBERT A. GODWIN

Norris & Bateman

ATTORNEYS

VOLTAGE CHARACTERISTICS FOR TRANSISTORS 186 & 187

| | E | B | C |
|---|---|---|---|
| ON | 0 | 0.5 | 0 |
| OFF | 0 | 0 | +20 |

VOLTAGE CHARACTERISTICS FOR TRANSISTORS IN MULTIVIBRATOR 191

| | E | B | C |
|---|---|---|---|
| OFF | 0 | 0 | 24 |
| ON | 0 | 0.5 | 0.2 |

INVENTOR
JOHN W. AQUADRO
and
GILBERT A. GODWIN

Norris & Bateman
ATTORNEYS

| | E | B | C |
|---|---|---|---|
| OFF | 0 | 0 | +24 |
| ON | 0 | 0.5 | 0.2 |

VOLTAGE CHARACTERISTICS FOR TRANSISTORS IN MULTIVIBRATOR 137

INVENTORS
JOHN W. AQUADRO
GILBERT A. GODWIN

Norris & Bateman
ATTORNEYS

INVENTORS
JOHN W. AQUADRO
GILBERT A. GODWIN
BY Norris & Bateman
ATTORNEYS

INVENTORS
JOHN W. AQUADRO
GILBERT A. GODWIN

BY Norris & Bateman
ATTORNEYS

INVENTORS
JOHN W. AQUADRO
GILBERT A. GODWIN
BY Norris & Bateman
ATTORNEYS

| | E | B | C |
|---|---|---|---|
| OFF | 0 | 0 | 124 |
| ON | 0 | 0.5 | 0.2 |

VOLTAGE CHARACTERISTICS FOR TRANSISTOR IN MULTIVIBRATOR 312

INVENTORS
JOHN W. AQUADRO
GILBERT A. GODWIN
BY Norris D. Bateman
ATTORNEYS

VOLTAGE CHARACTERISTICS FOR TRANSISTOR 355

| | E | B | C |
|---|---|---|---|
| ON | +6 | +6 | +6 |
| OFF | +6 | +12 | 0 |

VOLTAGE CHARACTERISTICS FOR SWITCH 359

| | A | $G_A$ | $G_C$ | C |
|---|---|---|---|---|
| ON | 1.4 | 1.4 | .4-9 | 0 |
| OFF | 24 | 24 | 0 | 0 |

INVENTORS
JOHN W. AQUADRO
GILBERT A. GODWIN
BY Norris & Bateman
ATTORNEYS

VOLTAGE CHARACTERISTICS
FOR TRANSISTOR 355c

| | E | B | C |
|---|---|---|---|
| ON | +6 | +6 | +6 |
| OFF | +6 | +12 | 0 |

VOLTAGE CHARACTERISTICS
FOR SWITCH 359c

| | A | $G_A$ | $G_C$ | C |
|---|---|---|---|---|
| ON | 1.4 | 1.4 | 4.9 | 0 |
| OFF | 24 | 24 | 0 | 0 |

INVENTORS
JOHN W. AQUADRO
GILBERT A. GODWIN

BY Norris & Bateman

ATTORNEYS

VOLTAGE CHARACTERISTICS
FOR TRANSISTOR 404

| | E | B | C |
|---|---|---|---|
| ON | 12 | 12 | 12 |
| OFF | 12 | 14 | 0 |

VOLTAGE CHARACTERISTICS
FOR SWITCH 486

| | A | G | G | C |
|---|---|---|---|---|
| ON | 1.4 | 1.4 | .4 .5 | 0 |
| OFF | 24 | 24 | 0 | 0 |

INVENTORS
JOHN W. AQUADRO
GILBERT A. GODWIN
BY Norris & Bateman
ATTORNEYS

INVENTORS
JOHN W. AQUADRO
GILBERT A. GODWIN

BY Norris & Bateman

ATTORNEYS

INVENTOR
JOHN W. AQUADRO
and
GILBERT A. GODWIN

Norris & Bateman
ATTORNEYS 3,254,728
Patented June 7, 1966

3,254,728

AUTOMATIC BATCH WEIGHER USING DIGITAL COUNT-DOWN CONTROL SYSTEM

John W. Aquadro, Wayne, and Gilbert A. Godwin, Oakland, N.J., assignors to Howe Richardson Scale Company, Clifton, N.J., a corporation of Delaware Filed Mar. 11, 1964, Ser. No. 351,116
20 Claims. (Cl. 177—15)

The present invention relates to weighing apparatus and more particularly to a digital control system for an apparatus which is capable of automatically weighing successive batches of different materials in selectively variable amounts.

In automatic batch weighing operations, it is the practive to set up the desired weights of different ingredients needed to make up a given formulation and to enter this weight information in coded form to command the operation of a system for controlling the delivery and discharge of the materials with respect to a scale. For example, it may be required to weigh out fifty pounds of a first ingredient and one hundred of a second ingredient to make up a desired formulation. These weight selections are fed into the control system which then commences a weighing cycle.

In feeding each ingredient to the scale, two rates of feed are needed under certain conditions. One rate is called the full flow feed rate and the other rate is referred to as the dribble feed. Conventionally, delivery of material to the scale is started at the full flow feed rate and is then reduced to the lesser dribble feed as the selected weight is approached. The point in the weighing cycle where the full flow feed rate is reduced to the dribble feed rate is referred to herein as the dribble point. The point in the weighing cycle at which delivery of material to the scale is completely cut off will be referred to herein as the final cut-off point. To compensate for various time lags that are inherent in conventional weighing apparatus, the final cut-off point is adjusted so that a signal is generated to stop delivery of material before the scale senses the desired weight.

In the past it has been the general practice to employ analog systems for controlling the feed and discharge of different materials with respect to a scale. In this type of weighing control system, if fifty pounds of a first material and twenty pounds of a second material are desired, the control points are set at fifty pounds for the first material and at fifty plus twenty or seventy pounds for the second material. Thus, the feeding of the first material will be stopped when the scale senses a weight of fifty pounds, and the feeding of the second material is interrupted when the scale senses a weight equal to the accumulative sum of the weights of the two materials.

Such accumulative weighing systems are especially disadvantageous since the errors made in weighing one ingredient affect the amount of the following ingredient that is weighed out in a formulation. If the amount weighed of a first material, for example, is light, then the amount of the second material that is weighed out will be heavy since the second control point is set to stop feeding of the second material when the scale senses a weight equal to the sum of the two selected weights of the first and second materials. As a result, there will not only be a weighing error in the amount of the first material, but there will also be an error in the amount of the second material fed to the scale.

In obviating the foregoing objectionable conditions, the present invention has as its principal object a novel digital control system for obtaining quick and accurate measurements of weight.

In the digital control system of this invention, the control points at which feeding of each material is stopped are non-accumulatively set; that is, if fifty pounds of a first material and twenty pounds of a second material are desired, the selection controls are set for these weights, and feeding of the second material is stopped when the scale senses an addition of twenty pounds. If the weighed amount of the first material is light, therefore, the error does not affect the amount weighed of the second material.

In accordance with the present invention, a number corresponding to the weight of material which is desired is selectively entered into an electronic bidirectional control counter which is coupled by a bidirectional pulse generator to the scale of the weighing apparatus. With the control system of this invention, the control counter counts down from the selected weight towards zero in response to feeding of material to the scale. Thus, the appearance of all zeros in the counter indicates that the desired, ordered weight has been delivered to the scale.

Operation of the digital control system of this invention on a count-down rather than the usual count-up basis has several advantages. First, it permits the counter to be cleared after each material in a formulation has been delivered to the scale so that the numbers entered into the control counter for each ingredient will be equal to the selected weight which is desired to be weighed out. Second, it usually is not essential to readjust the dribble and final cut-off points for a change in formulation. For example, if fifty pounds of an ingredient has been selected to make up a first formulation, the dribble and final cut-off points may be set for forty and forty-seven pounds respectively if a conventional count-up type of system is used. When it is desired now to change the formulation by reducing the desired weight of the ingredient to forty pounds, it is apparent that the dribble and final cut-off points must be adjusted correspondingly. With the present invention, however, no such readjustments are needed owing to the count-down mode of operation of the control system.

Accordingly, a further object of this invention is to provide a weighing apparatus with a novel digital control system having the foregoing count-down characteristics.

More specifically, it is a further object of this invention to provide a weighing apparatus with a novel digital control system having a bidirectional control counter which in response to material fed to a scale counts down from a selected weight towards zero.

Another object of this invention is to provide an automatic batch weighing apparatus with a novel solid state electrical control system which permits ease of weight selection, adjustment, and overall operation.

Still another object of this invention is to provide an automatic weighing apparatus with a novel digital control system having logic circuits for weight selection, adjustment of dribble and final cut-off points, and overweight and underweight checking.

A further object of this invention is to provide an automatic batch weighing apparatus with a novel digital control system which is operable to automatically interrupt a feeding cycle involving the delivery of successive drafts of ingredients whenever the delivered weight of any one of the ingredients is not within a preselected tolerance of the desired, ordered weight.

Another object of this invention is to provide an automatic batch weighing apparatus with a novel digital control system which is automatically operable to control the delivery of successive, preselected amounts of different ingredients, to control the feed rate for each ingredient, to provide an overweight and underweight check for each ingredient, to provide a readout of the weight received by the scale in the weighing apparatus, and to discharge the ingredients after the feeding cycle is completed.

Further objects of the invention will appear as the description proceeds in connection with the appended claims and annexed drawings wherein:

Figure 1:
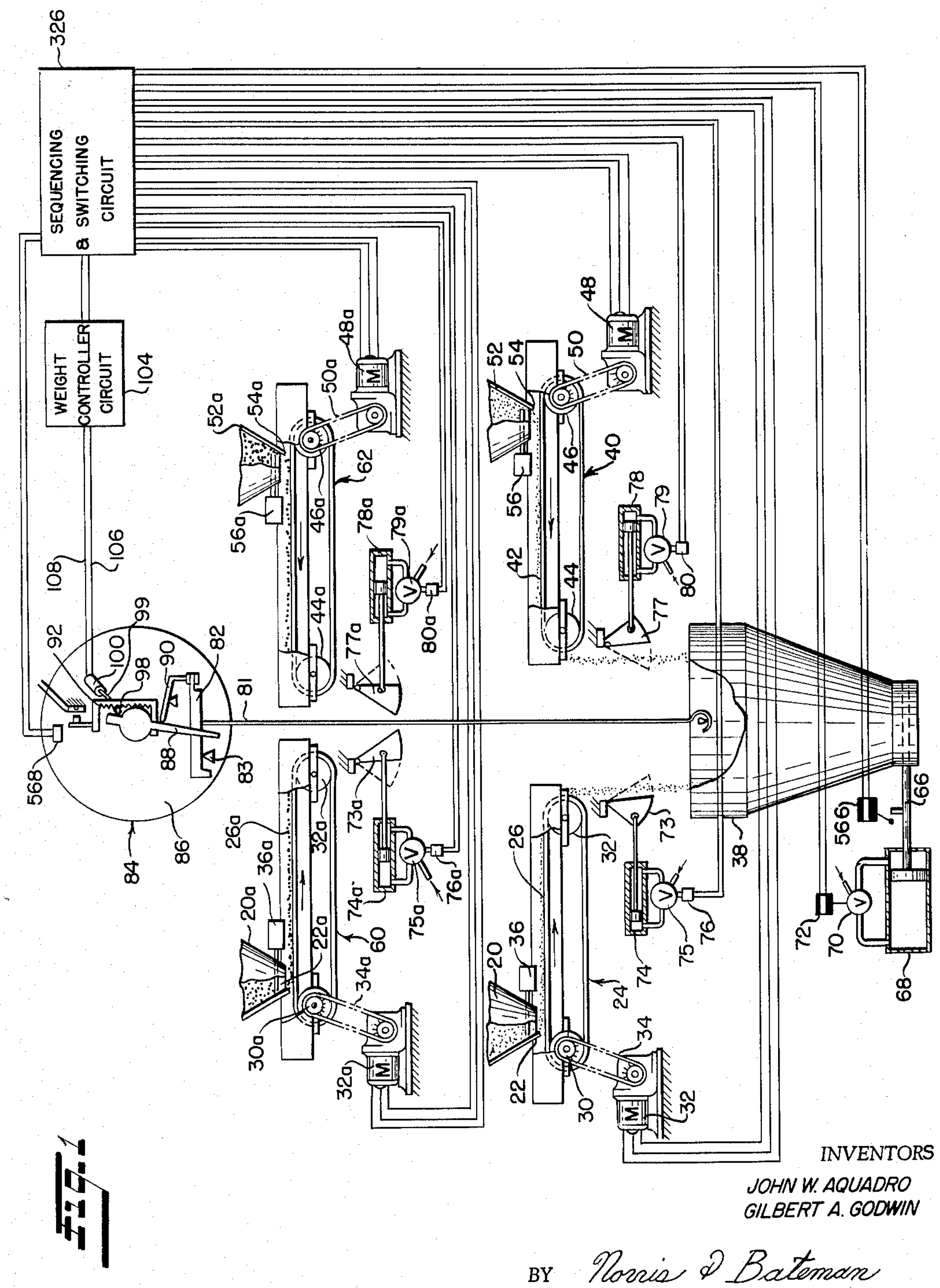
FIGURE 1 is a generally diagrammatic view illustrating an automatic batch weighing apparatus constructed according to a preferred embodiment of the present invention.
Figure 2:
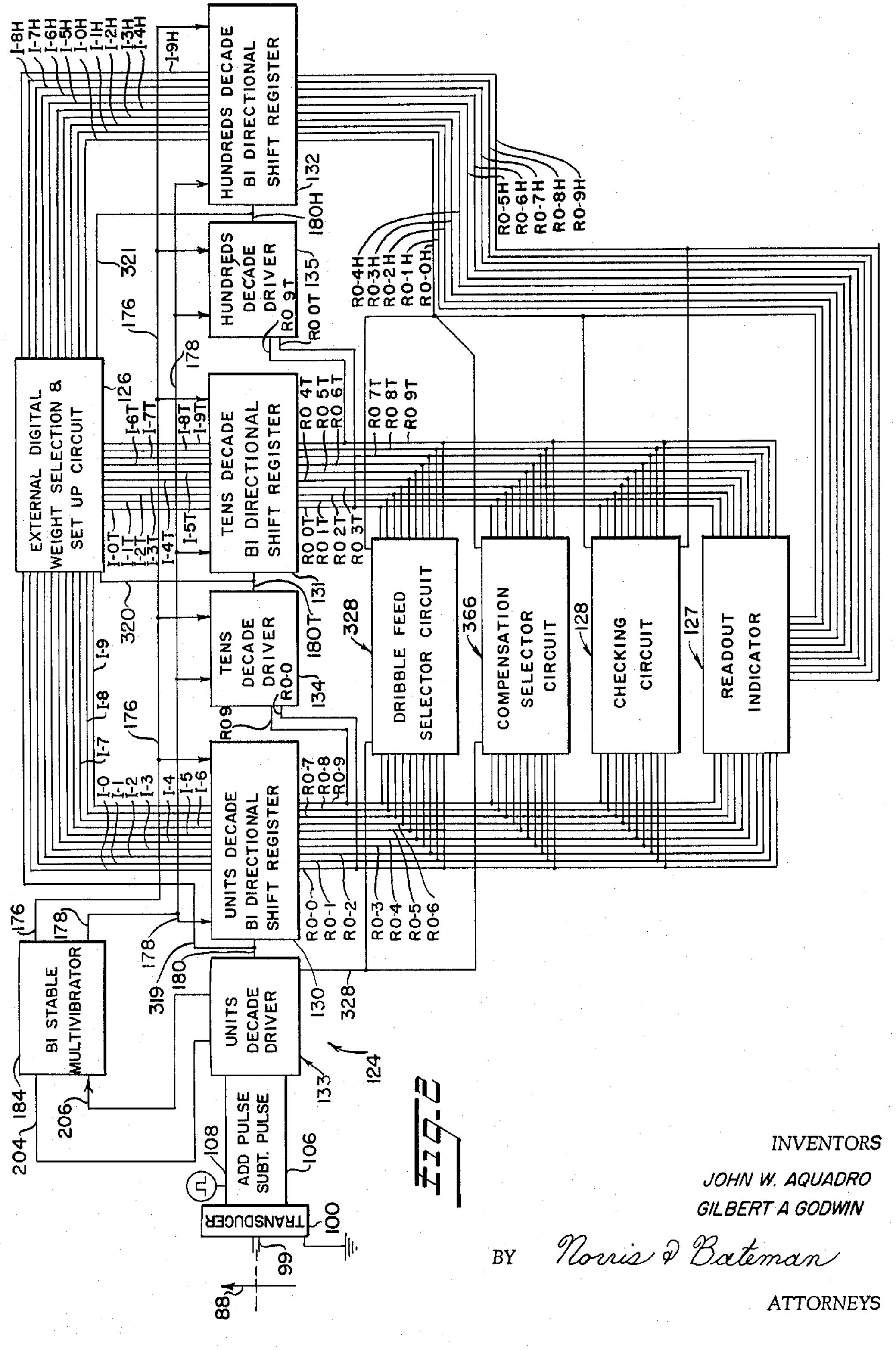
FIGURE 2 is a diagrammatic view of the weight controller circuit shown in FIGURE 1.
Figure 3:
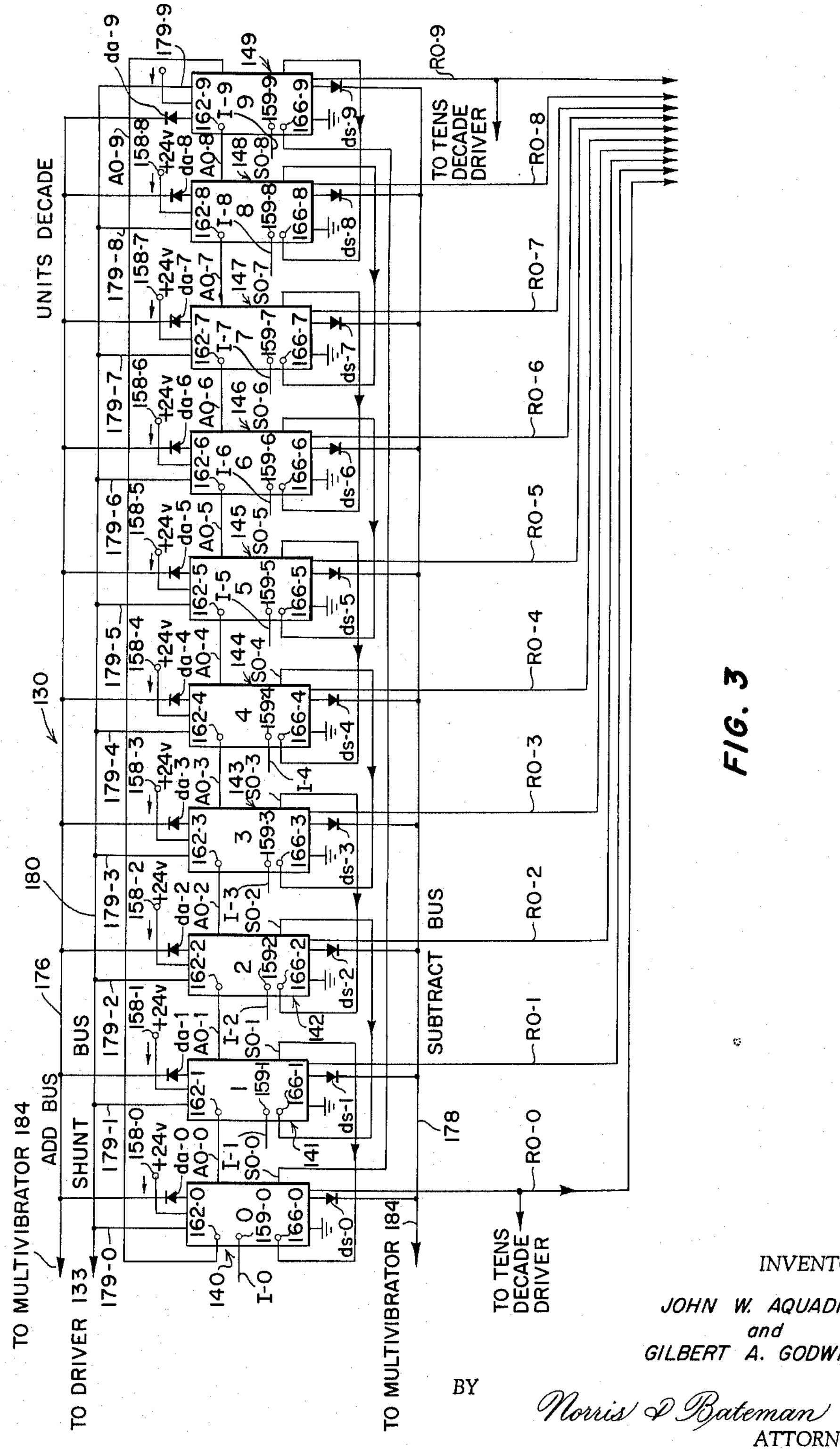
Figure 4:
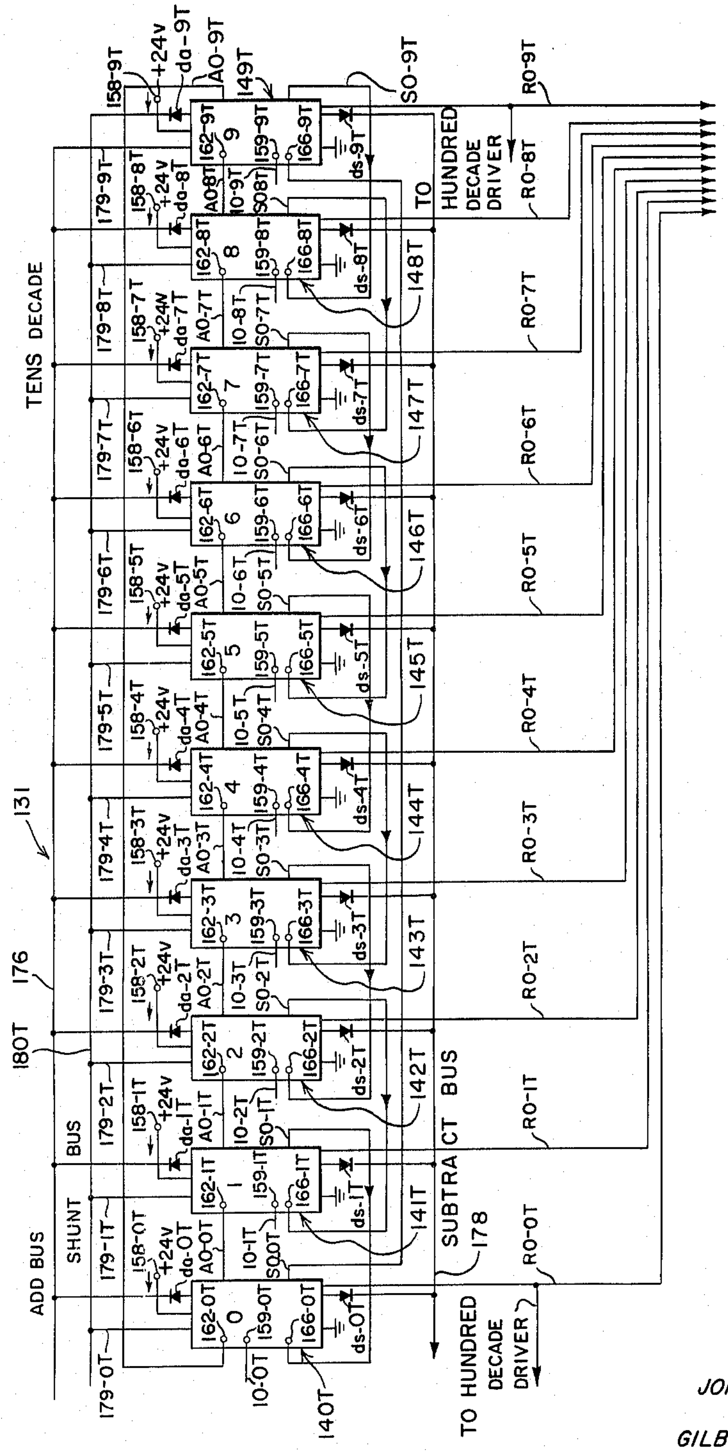
Figure 5:
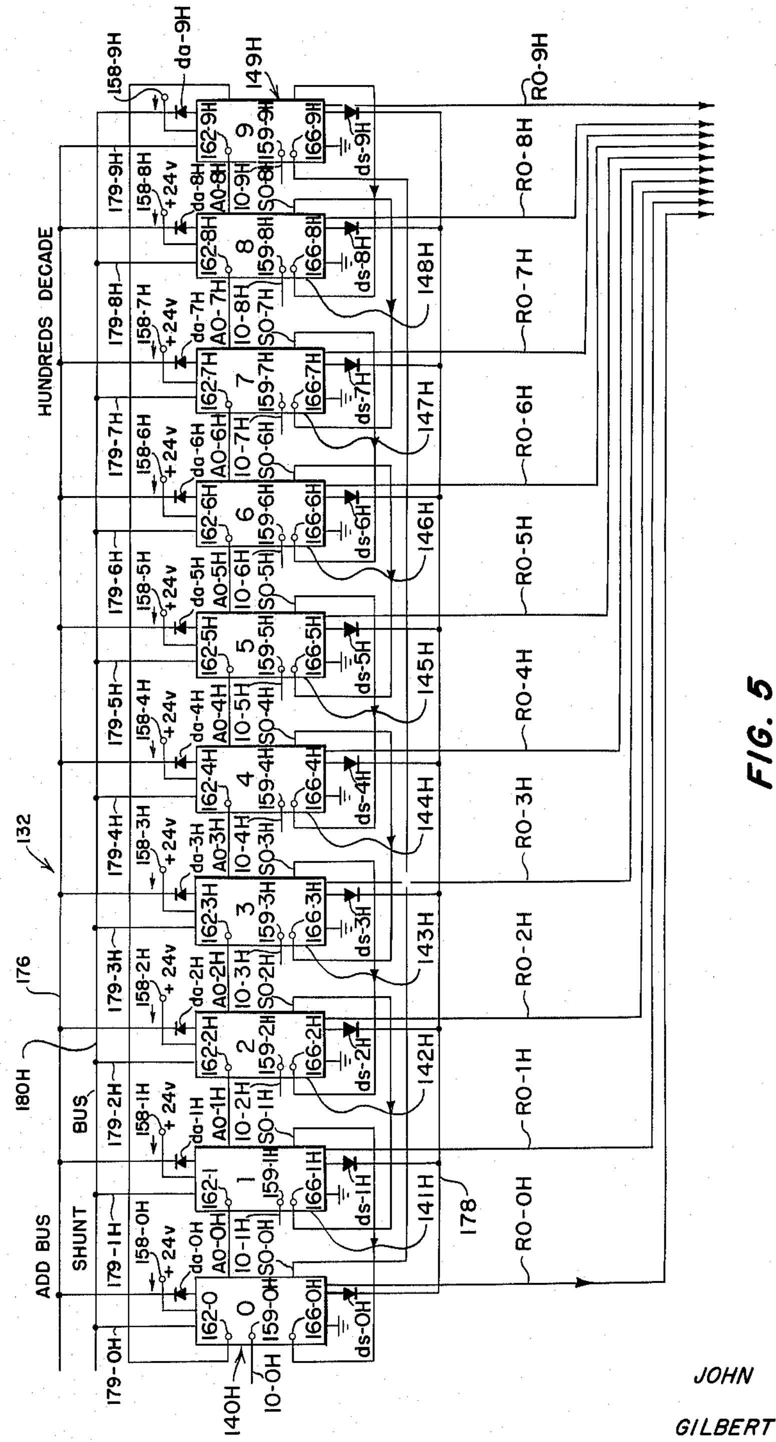
Figure 6:
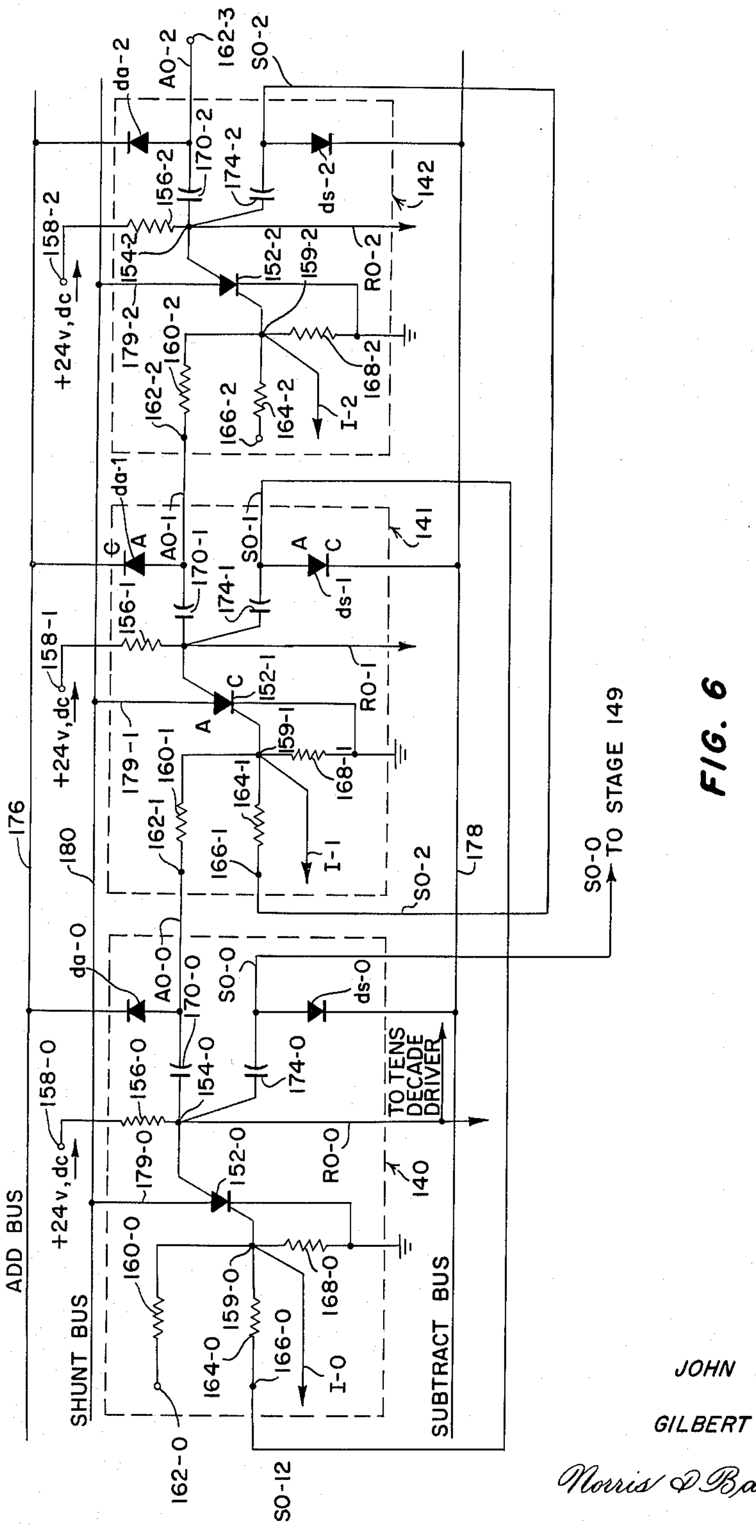
Figure 7:
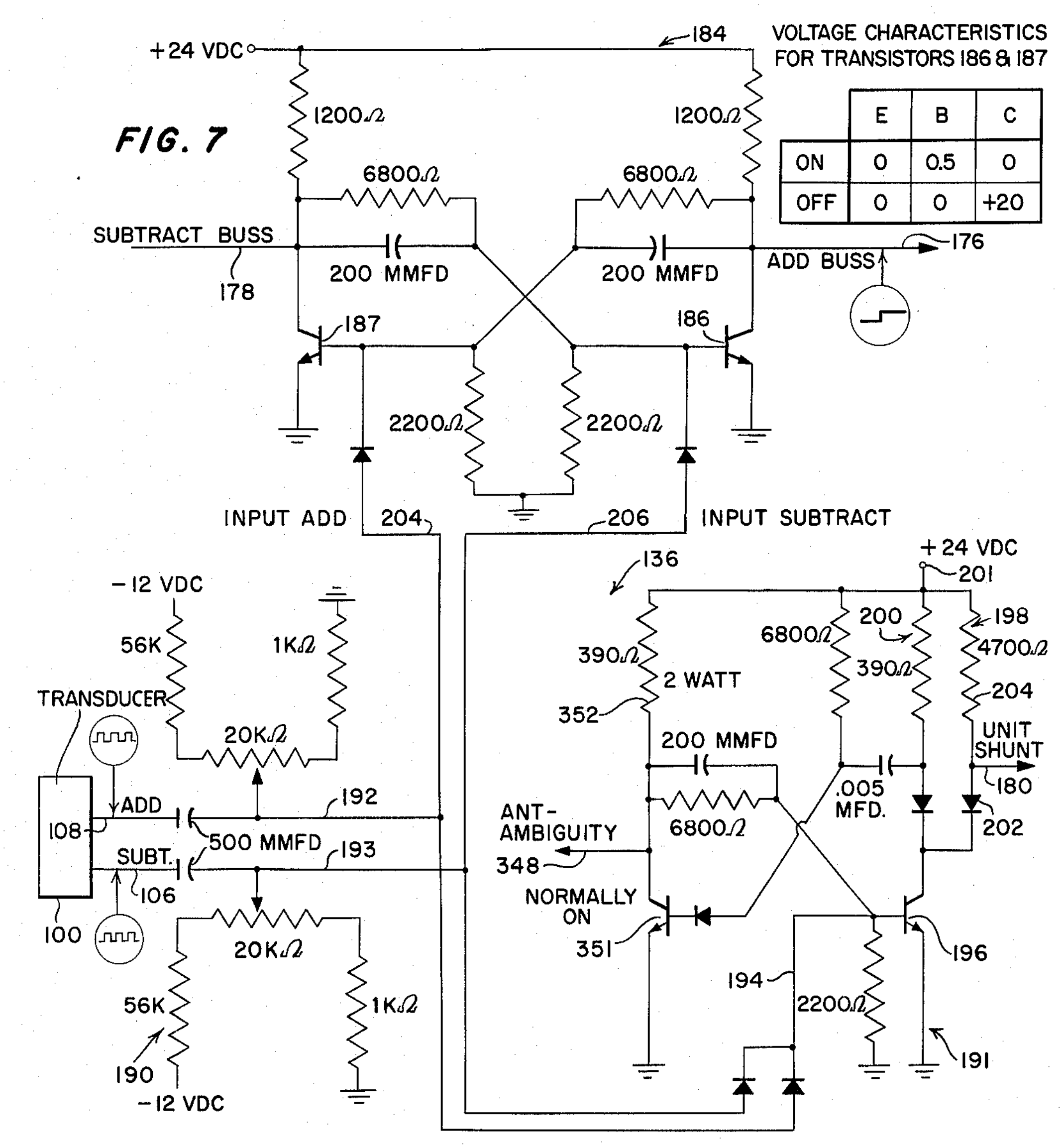
Figure 8:
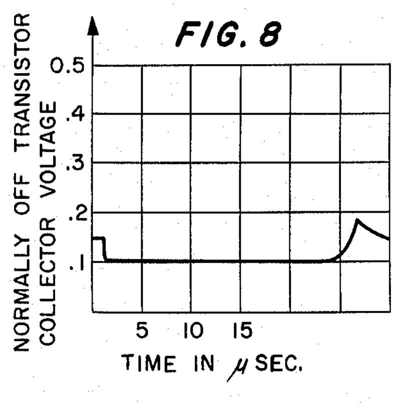
Figure 9:
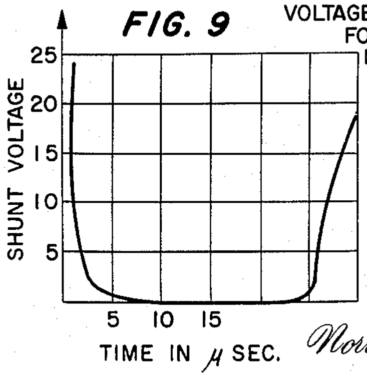
Figure 10:
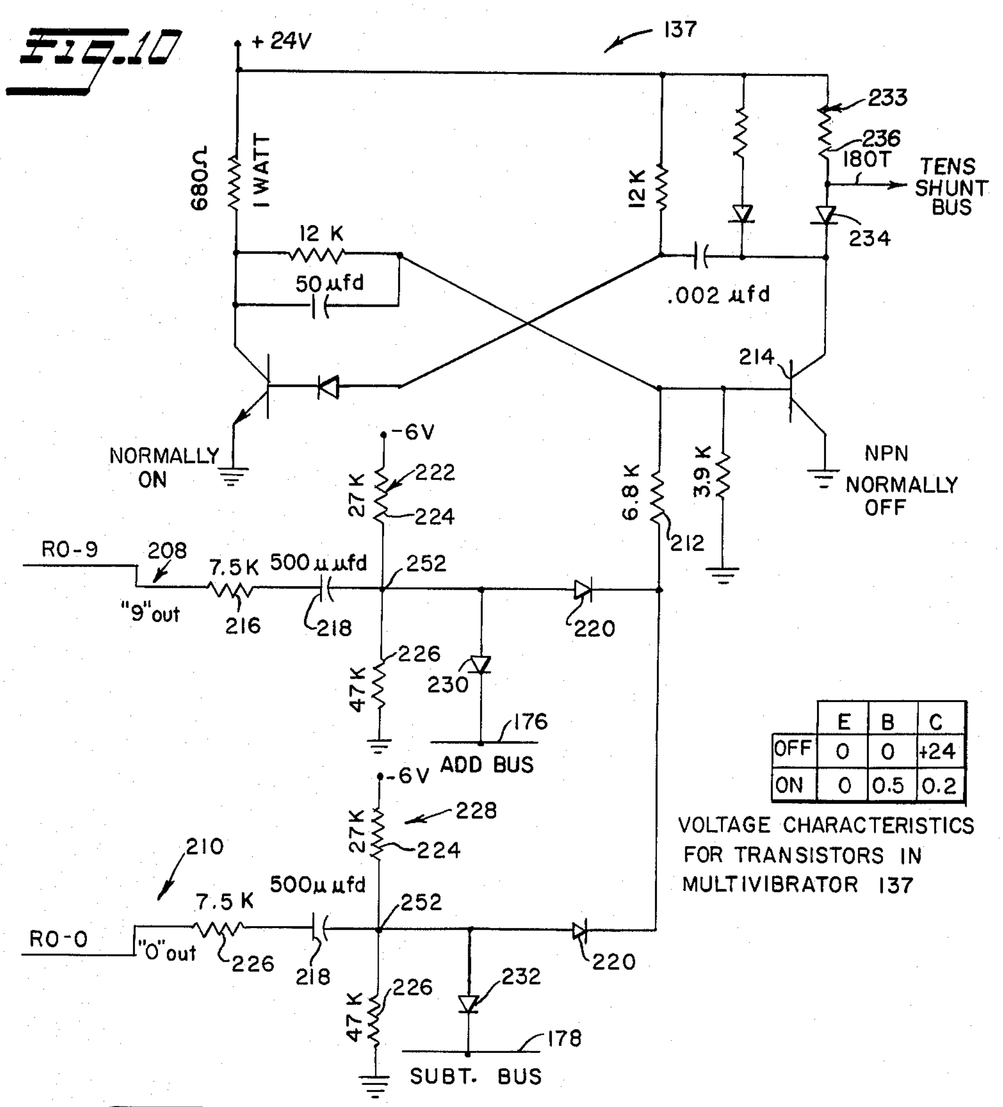
Figure 12:
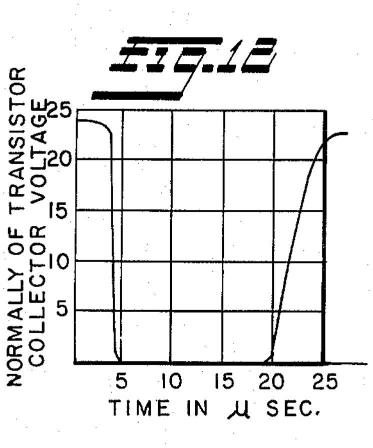
Figure 13:
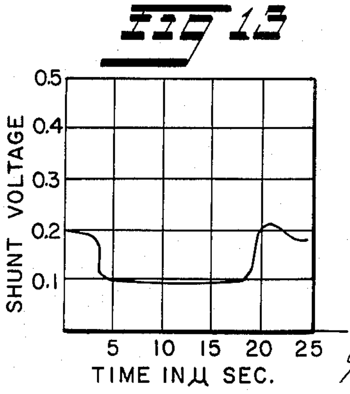
Figure 11:
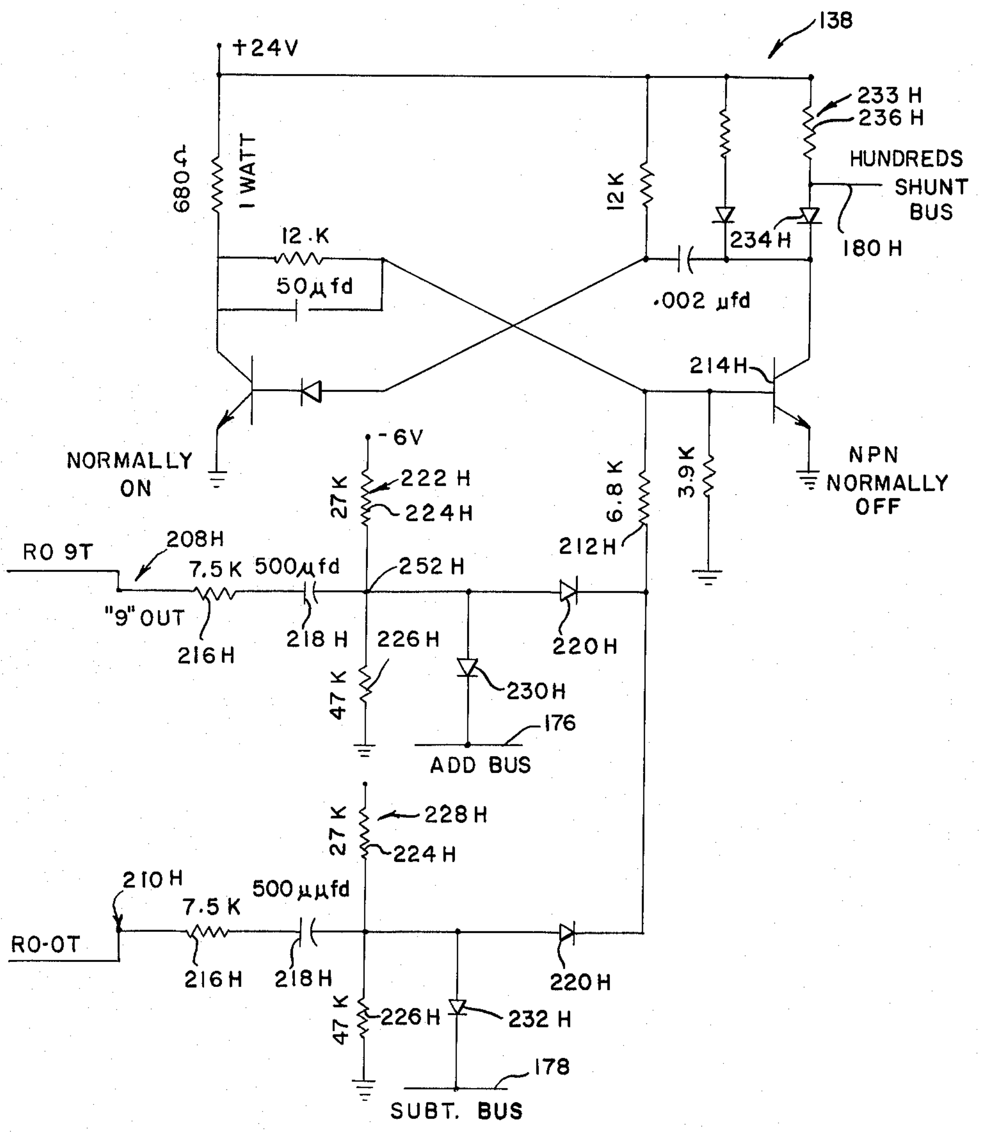
Figure 14:
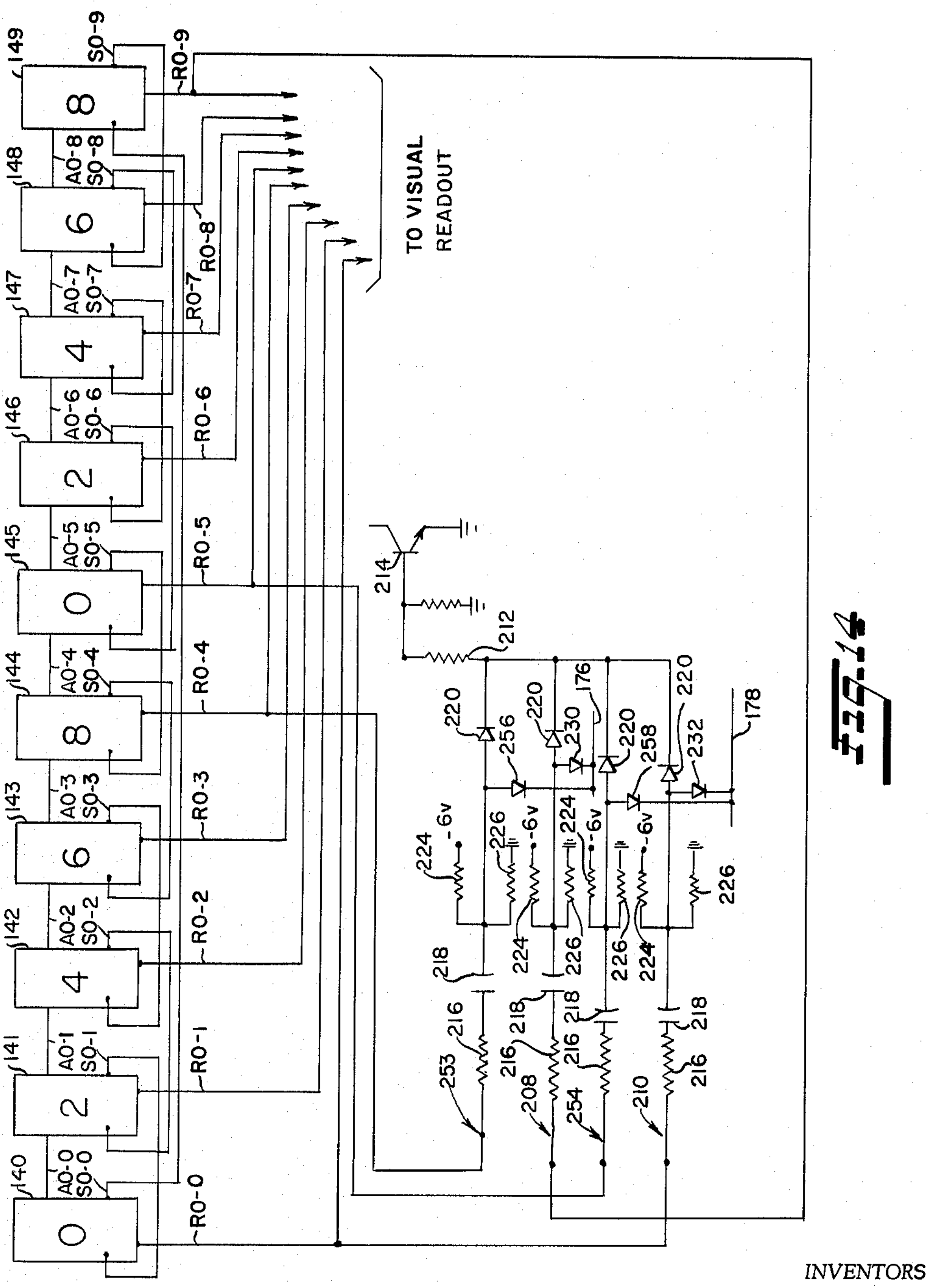
Figure 15:
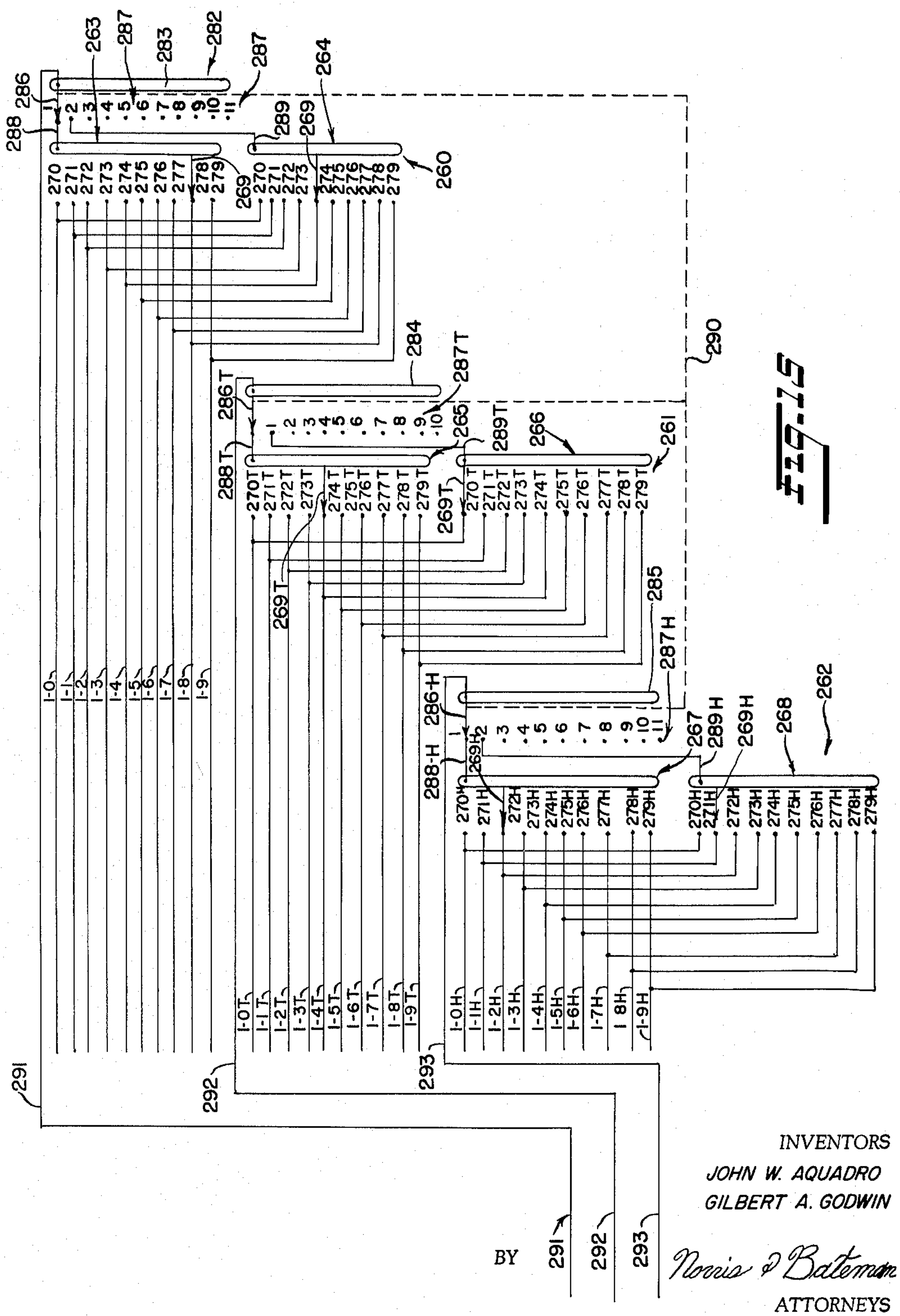
Figures 15, 15A, 16A:
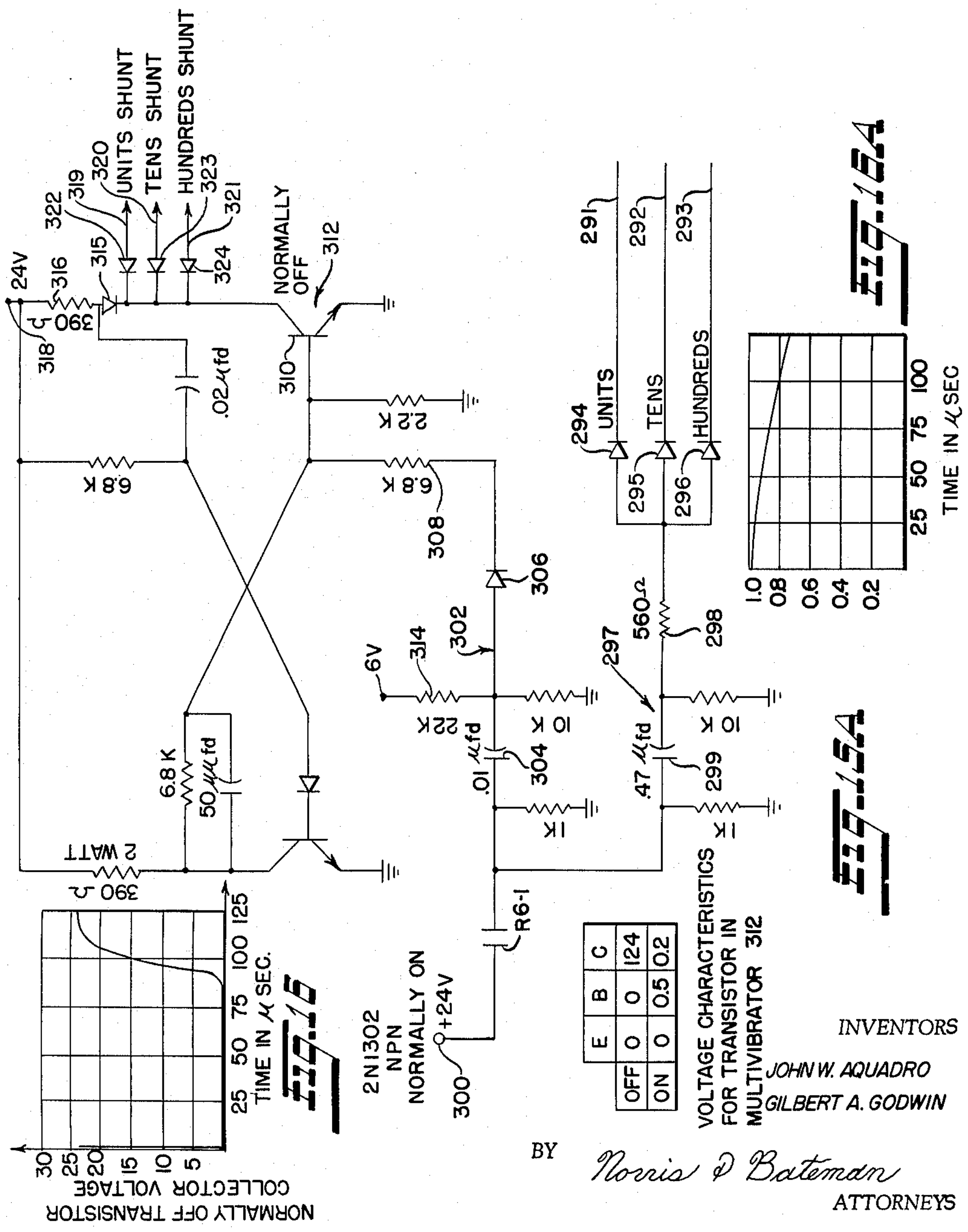
Figure 12:
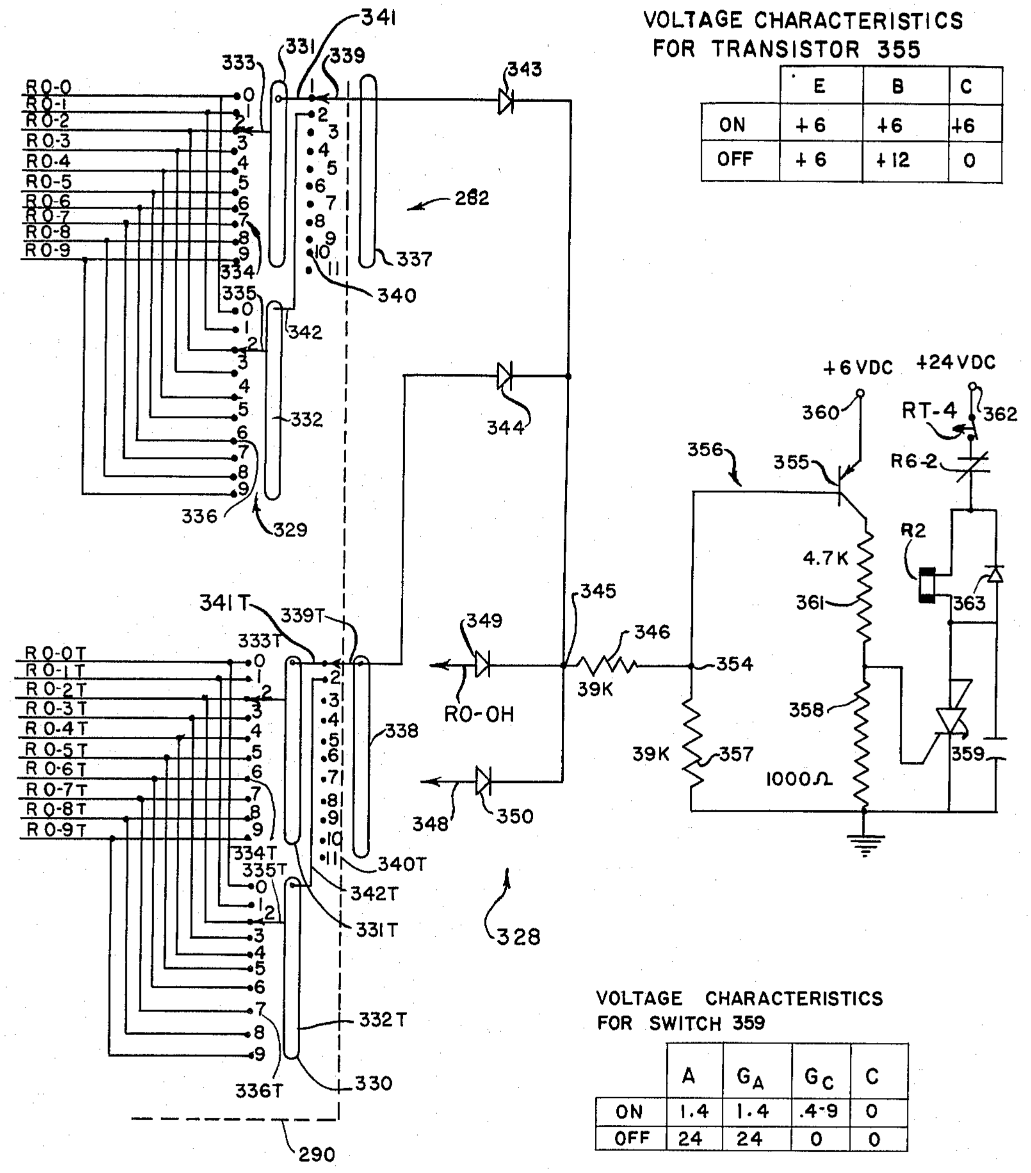
Figure 18:
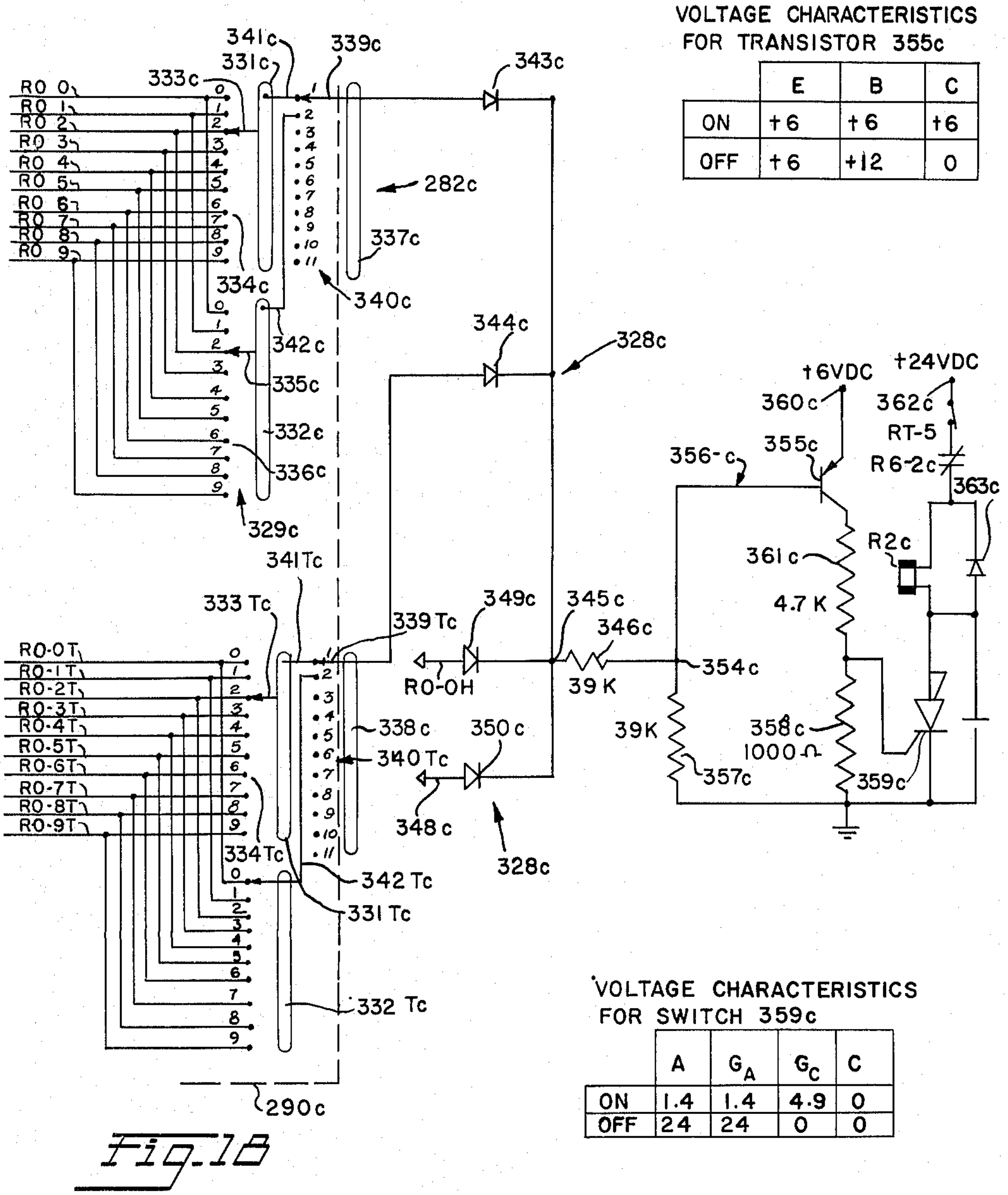
Figure 19:
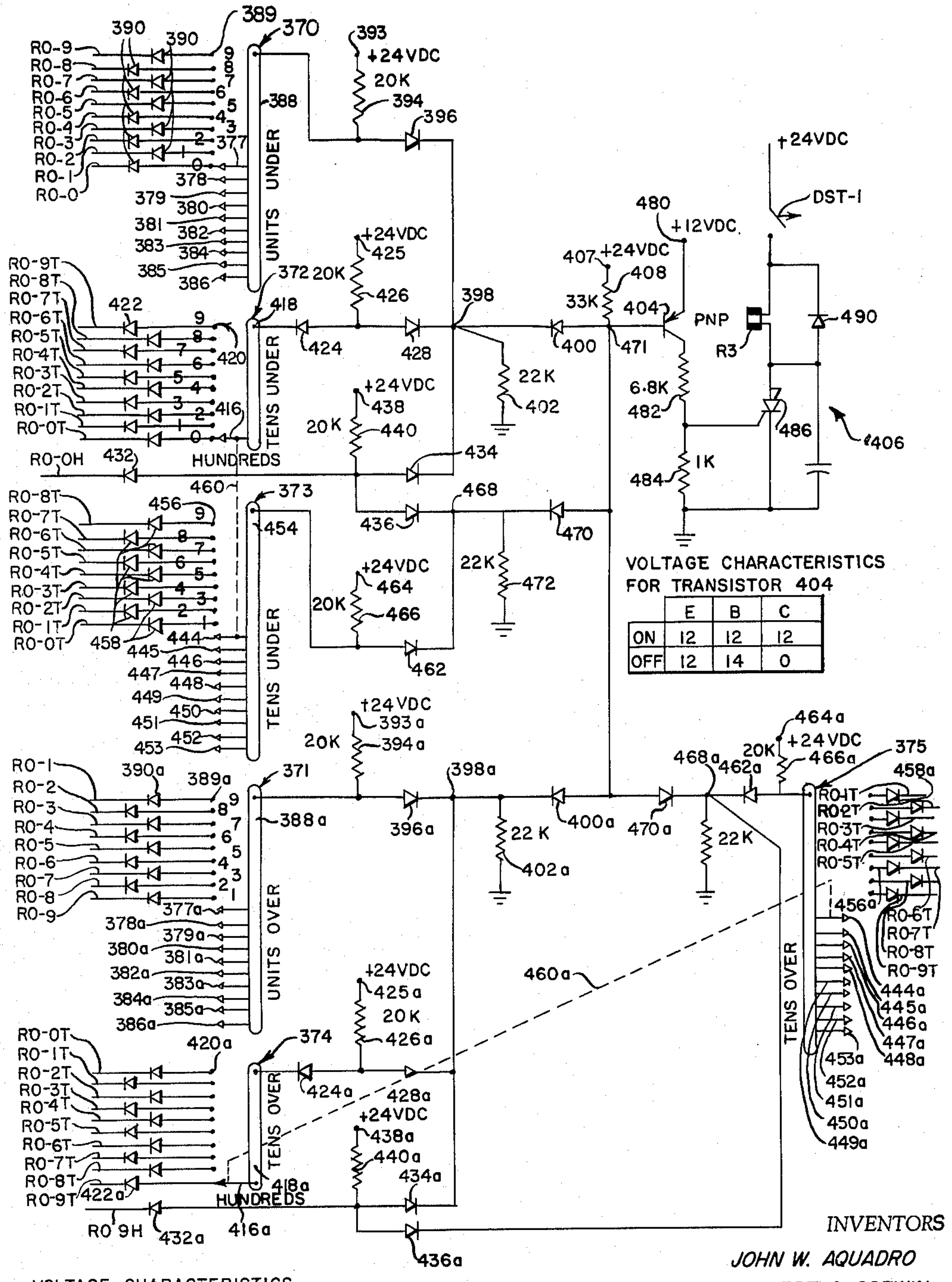
Figures 20, 20A:
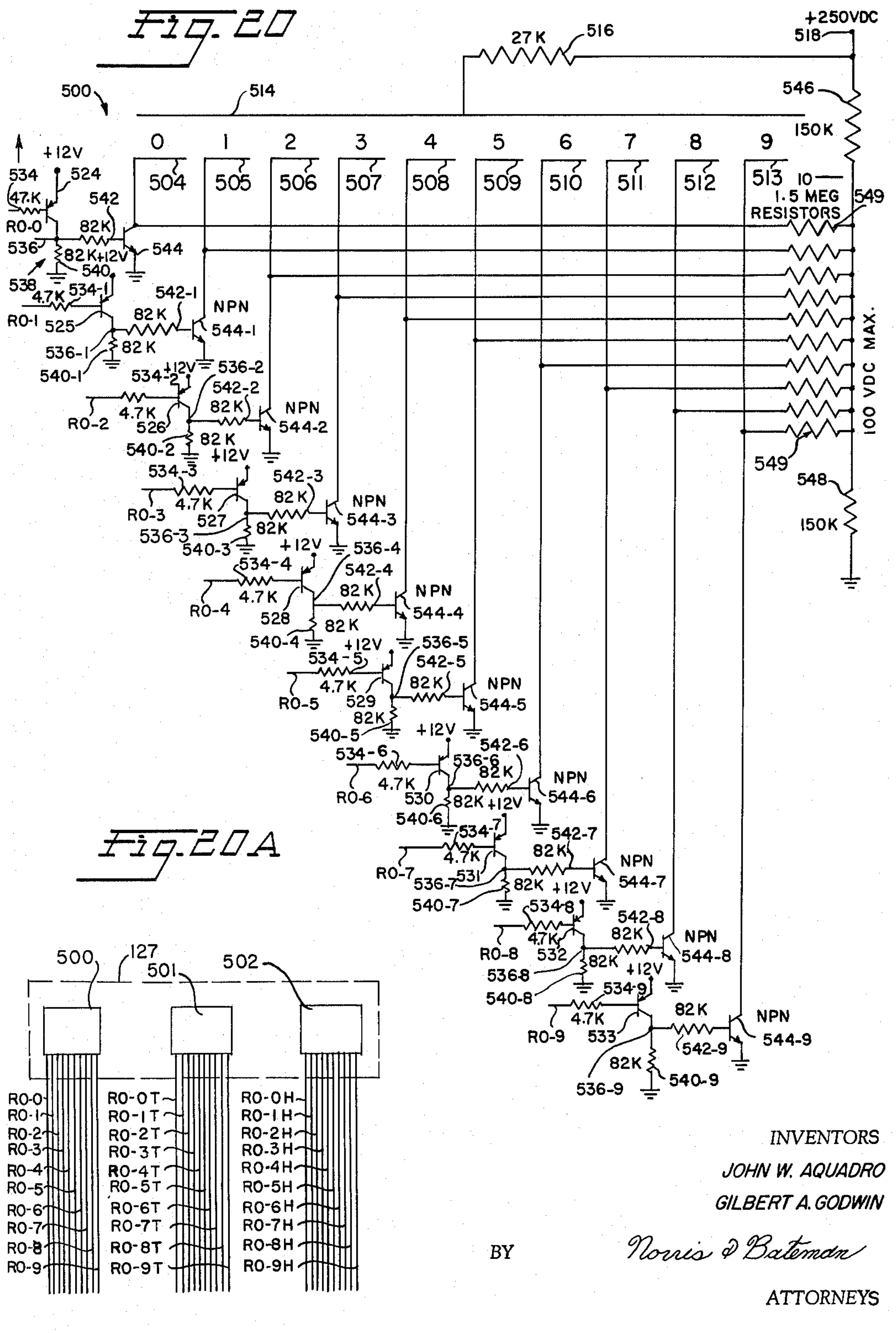
Figure 21:
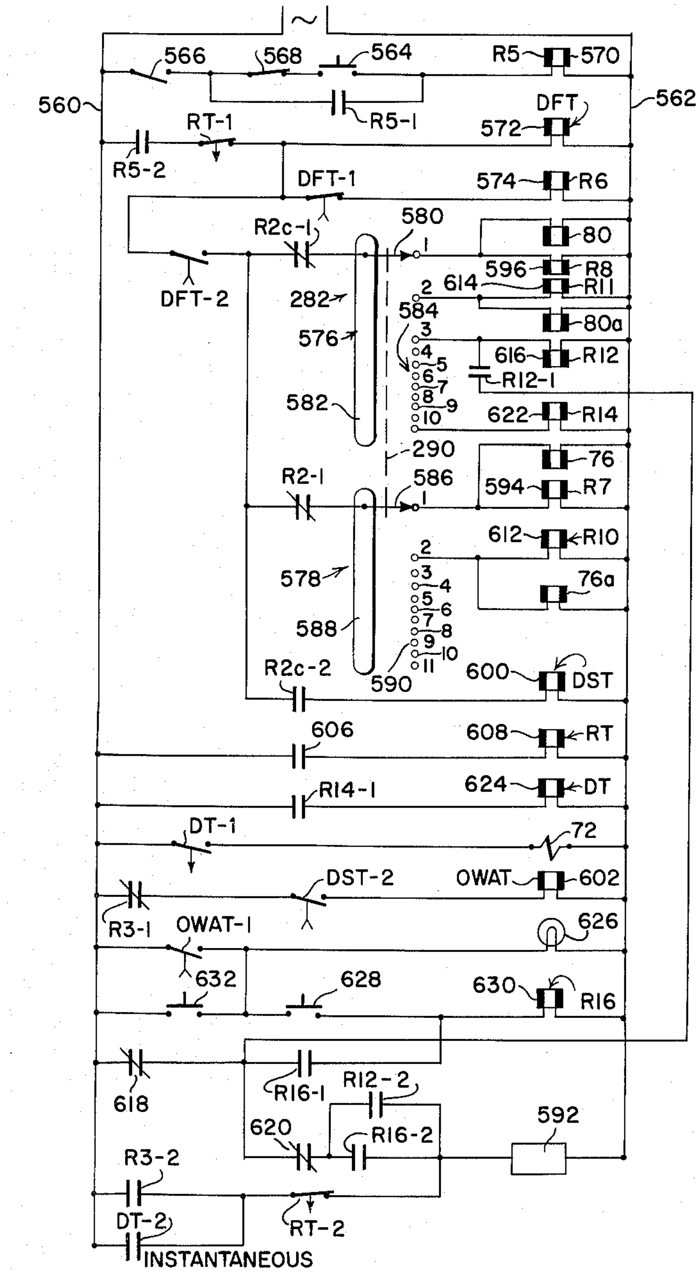
Figure 22:
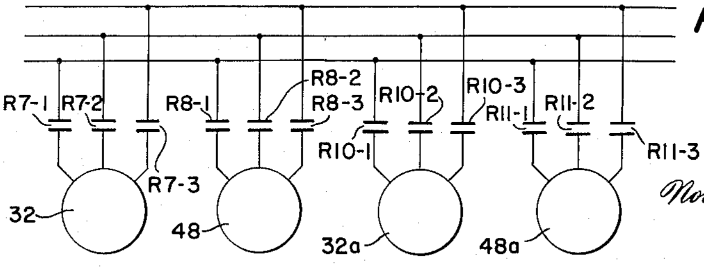

FIGURES 3, 4 and 5 respectively are circuit diagrams of the units decade shift register, the tens decade shift register, and the hundreds decade shift register illustrated in FIGURE 2;

FIGURE 6 is a circuit diagram of the first three stages in the units decade shift register shown in FIGURE 3;

FIGURE 7 is a detailed circuit diagram of the input side of the weight controller circuit shown in FIGURE 1 and including the circuitry for the driver of the units decade shift register illustrated in FIGURE 3;

FIGURES 8 and 9 are voltage waveform diagrams for signals applied to elements in the circuit shown in FIGURE 7;

FIGURES 10 and 11 are circuit diagrams of the tens decade driver and of the hundreds decade driver shown in FIGURE 3;

FIGURES 12 and 13 are voltage waveform diagrams for signals applied to elements in the circuit shown in FIGURE 10;

FIGURE 14 is a modified circuit diagram of the units decade driver and of the units decade shift register for providing a different scaling factor than that associated with the circuit shown in FIGURE 3;

FIGURES 15 and 15A illustrate a diagram of the weight set up and selection circuit shown in FIGURE 3;

FIGURES 16 and 16A are voltage waveform diagrams of signals applied to elements in the circuit shown in FIGURE 15A;

FIGURE 17 is a diagram of the dribble feed control circuit illustrated in FIGURE 3;

FIGURE 18 is a diagram of the compensation control circuit illustrated in FIGURE 3;

FIGURE 19 is a diagram of the underweight and overweight checking circuit illustrated in FIGURE 3;

FIGURES 20 and 20A are circuit diagrams of the indicating device illustrated in FIGURE 3;

FIGURE 21 is a diagram of the sequencing and switching circuit illustrated in FIGURE 1; and FIGURE 22 is a diagram of the energizing circuits for the material feed motors shown in FIGURE 1.

In its preferred embodiment, the invention will be described as employed in an automatic batch weighing apparatus having separate motor-driven material feeding mechanisms for full flow and dribble flow. It will be appreciated, however, that the invention is applicable to weighing apparatus having no dribble feed as well as apparatus employing a gravity feed.

*Weighing apparatus*

Referring now to the drawings wherein the same reference numerals designate like parts throughout, the weighing apparatus of this invention shown in FIGURE 1 comprises a hopper 20 having an open bottom 22 for discharging a first fluent or particulate material in a layer upon an endless belt, power driven feeder 24 of conventional construction. Feeder 24 has an upper belt flight 26 which is horizontal and which moves from left to right in FIGURE 1 between pulleys 28 and 30. An electric motor 32 connected to pulley 30 by an endless chain 34 drives pulleys 28 and 30 at the same constant speed. A manually operated discharge gate 36 is provided to control delivery of material from hopper 20 to feeder 24. The material passing through the open bottom 22 of hopper 20 is advanced in a layer on the upper belt flight 26 of feeder 24. This material falls off the end of the flight as it passes around pulley 28 and descends in a freely falling continuous column directly into a weigh hopper 38. In this embodiment, feeder 24 is employed to deliver material to hopper 38 at a full flow rate and a separate feeder 40 is used to deliver a dribble feed to the weigh hopper.

Feeder 40 preferably is of the same construction as feeder 24 and has a conveyor belt comprising an upper flight 42 which moves horizontally from right to left in FIGURE 1 between two pulleys 44 and 46. Pulleys 44 and 46 are driven at the same constant speed by an electric motor 48 which is connected to pulley 46 by an endless chain drive 50. A fixed hopper 52 having an open bottom 54 positioned over feeder 40 discharges material by gravity onto belt flight 42. Hopper 52 is provided with a conventional manual operated discharge gate 56 for controlling delivery of material to feeder 40.

With continued reference to FIGURE 1, the material discharged by hopper 52 and advanced by belt flight 42 to the end of feeder 40 above weigh hopper 38 falls off belt flight 42 as it passes around pulley 44 and descends in a freely falling column directly into the hopper.

In the construction shown in FIGURE 1, the relative positions of feeders 24 and 40 are only diagrammatically illustrated and, in practice, feeder 40 may be positioned beside feeder 24 to provide a more compact assembly. In such case, it is clear that hopper 52 may be an extension or part of hopper 20.

To deliver a second material to weigh hopper 38, separate full flow and dribble flow feeders 60 and 62 are provided. Feeders 60 and 62 may be of the same construction as feeders 24 and 40 as shown in FIGURE 1. Accordingly, the parts of feeders 60 and 62 which are the same as the parts in feeders 24 and 40 have been designated by like reference characters suffixed with the letter *a*.

While the material feeding apparatus described herein is limited to the delivery of two ingredients to weigh hopper 38, it will be appreciated that any number of ingredients may be delivered to hopper 38 by adding further feeding apparatus of the type already described. It also will be appreciated that any other suitable arrangement of feeding may be employed. Also other types of material feeding apparatus may be employed such as, for example, screw conveyors.

As shown in FIGURE 1, weigh hopper 38 is provided with a discharge gate 66 for controlling the discharge of material through the open bottom of hopper 38 by gravity. Gate 66 is opened and closed by a suitable fluid motor 68. A valve 70 actuated by a solenoid 72 controls the supply and exhaust of fluid for operating motor 68. When solenoid 72 is energized, motor 68 is operated to open gate 66. Deenergization of solenoid 72 causes gate 66 to close.

With continued reference to FIGURE 1, a pivotally mounted full flow catch gate 73 is interposed between feeder 24 and hopper 38. Gate 73 is swung about its pivot axis between its full line and dotted line positions to respectively permit and interrupt delivery of material from feeder 24 by a suitable fluid motor 74. A valve 75 actuated by a solenoid 76 controls the supply and exhaust of fluid for operating motor 74. When solenoid 76 is energized, motor 74 is actuated to cause gate 73 to open permitting feeder 24 to deliver material to hopper 38.

As shown in FIGURE 1, a further pivotable catch gate 77 is interposed between feeder 40 and hopper 38. Gate 77 is swung between its full line and dotted line positions by a suitable fluid motor 78 to permit and interrupt delivery of material from feeder 40. A valve 79 actuated by a solenoid 80 controls the supply and exhaust of fluid for operating motor 78. When solenoid 80 is energized, motor 78 is actuated to cause gate 77 to open permitting feeder 40 to deliver material to hopper 38.

Feeders 60 and 62, as shown in FIGURE 1, are also provided with catch gates and fluid motor operators of the same construction as just described for feeders 24 and 40. Accordingly, the catch gate structure for feeders 60 and 62 have been identified with like reference numerals suffixed with the letter *a* as shown.

With continued reference to FIGURE 1, weigh hopper 38 is suspended by a pair of arms 81 connected to a tare beam lever 82 which pivots about a fulcrum 83 of a dial type scale 84. Scale 84 is of conventional construction such as that disclosed in Fairbanks-Morse Bulletin No. 8105 or in United States application No. 760,017 filed September 10, 1958 and having the same assignee as herein. Essentially, scale 84 comprises a dial head 86 and a dial pointer 88 which is rotated as material is fed to weigh hopper 38. Downward movement of the right-hand end of tare beam lever 80 causes the left-hand end of a load beam lever 90 to move upwardly. A load beam gear rack 92 is provided to move with the left-hand end of load beam lever 90. In mesh with the teeth of gear rack 92 is a pinion 98 fixed on a shaft 99 of a transducer comprising a bidirectional incremental encoder or pulse geenrator 100 which provides two independent pulse outputs respectively corresponding to clockwise and counter-clockwise movement of dial pointer 88. Preferably, generator 100 is of such construction as to emit output signal pulses having a square waveform in response to rotation of shaft 99. It will be appreciated that the amplitudes of these output signal pulses are measured with respect to a common fixed voltage. In this embodiment, one pulse corresponds to one increment on the dial of scale 84, and one increment on the dial of scale 84 represents one pound. It will be appreciated, however, that other scaling factors may be employed as will be described later on in detail.

*Weight controller circuit general description*

Referring now to FIGURES 1 and 2, the outputs of generator 100 are coupled to a solid state weight controller circuit 104 by a pair of conductors 106 and 108. Circuit 104 comprises a bidirectional, decimal ring control counter 124 and a weight set up and selection circuit 126. Weight controller circuit 104 further includes an indicating device 127 which provides a readout of the number in counter 124. Counter 124 has an add input and a subtract input respectively connected to conductors 108 and 106.

In accordance with this invention, as dial pointer 88 moves up the scale in response to material fed to hopper 38, generator 100 produces signal pulses which are fed through conductor 106 to cause counter 124 to count down rather than count up. Conversely, as dial pointer 88 moves down the scale towards zero, add pulses are fed through conductor 108 to cause counter 124 to count up. The main purpose for this mode of counter operation will presently be explained in detail. The capability of counter 124 to perform add and subtract functions is especially useful to allow the counter to correct itself for any overshoots, surges, and/or vibrations which may be transmitted to the weighing apparatus.

In general, the batch weight desired to be weighed out is selectively set up as a plural order digit in circuit 126 in a manner to be presenting described. This digital information is entered into counter 124 and device 127 will readout the selected weight. Feeding of material to hopper 38 is then started at full flow rate. As weight is added to hopper 38, the pulses emitted by generator 100 cause counter 124 to start counting down from the selected weight toward zero.

Weight controller circuit 104, in accordance with the present invention, includes dribble feed and compensation networks which, as will be described later on in detail, provide for the selective adjustment of a dribble point and final cut-off point in a weighing cycle.

Since counter 124 is operating on a count-down basis from a selected weight or number corresponding to the selected weight, the dribble point is selected to occur at some count less than the weight selection, but more than the final cut-off point and/or all zeros in counter 124. The final cut-off point will then be set at some count less than the dribble point but usually more than all zeros in the counter 124 to compensate for the various time lags involved in interrupting the feeding of material after a cut-off signal is generated.

When the count corresponding to the selected dribble point is reached, controller circuit 104 will emit a signal to reduce the feed rate of material. Counter 124 will now continue to count down at a reduced rate as a result of the weight added to hopper 38 by the dribble feed. When the count corresponding to the selected final cut-off point is reached, controller circuit 104 will emit a further signal to cut off the dribble feed. The correct weight weighed out in hopper 38 should occur when counter 124 causes indicating device 127 to read out all zeros.

After the final cut-off of material feed is reached and scale 84 is permitted to stabilize, it is apparent that a light weighing is where a number greater than all zeros remains in counter 124. A heavy weighing, on the other hand, would put into counter 124 a number which is less than all zeros; that is, a number which has a 9 as its most significant digit. Weight controller circuit 104 is provided with a checking circuit 128 to determine if the weighing is within a selected tolerance or whether it was too light or too heavy. Circuit 128 will be described in detail later on.

*Control counter*

Referring now to FIGURE 2, counter 124 comprises a units decade bidirectional shift register 130, a tens decade bidirectional shift register 131, a hundreds decade bidirectional shift register 132, and three register drivers 133, 134, and 135 respectively comprising a Schmitt trigger 136 (FIGURE 7), a first one-shot multivibrator 137 (FIGURE 10), and a second one-shot multivibrator 138 (FIGURE 11). The output signal of trigger 136 is applied to the units decade register 130, and register 130, in turn, is coupled to driver 134. Similarly, driver 134 is coupled to the tens decade register 131, and register 131 is coupled to driver 135 which in turn is coupled to the hundreds decade register 132 in counter 124.

Referring now to FIGURES 3 and 6, the units decade bidirectional shift register 130 has ten coupled stages 140, 141, 142, 143, 144, 145, 146, 147, 148, and 149 respectively representing the numerals 0, 1, 2, 3, 4, 5, 6, 7, 8, and 9 for expressing a digit in a decimal numerical system. Stage 140, as shown in FIGURE 6, comprises a silicone controlled electric current conducting switch 152–0 having its anode gate connected to one terminal 154–0 of a resistor 156–0. The other terminal 158–0 of resistor 156–0 is connected to the positive side of a D.-C. voltage source of 24 volts. The cathode gate of switch 152–0 is connected to a terminal 159–0. A resistor 160–0 is connected between terminal 159–0 and an add input terminal 162–0. A resistor 164–0 is connected between a subtract input terminal 166–0 and terminal 159–0. An input conductor I–0 for transmitting a pulse to selectively turn switch 152–0 on and off is connected to terminal 159–0. A resistor 168–0 is connected between terminal 159–0 and ground. The cathode of switch 152–0 is connected directly to ground in parallel with the current path through resistor 168–0. When switch 152–0 is off, it does not conduct current from source 158–0 to ground. When switch 152–0 is on, it conducts current to ground.

With continued reference to FIGURE 6, terminal 154–0 is connected through a capacitor 170–0 to an add output conductor AO–0. Terminal 154–0 is also connected through a capacitor 174–0 to subtract output conductor SO–0. Also connected to terminal 154–0 is a readout conductor RO–0.

The circuitry for stages 141–149 is the same as that just described for stages 140. Accordingly, like reference characters have been used to designate like elements except that the last numeral in each reference character has been changed to correspond with the digit associated with its stage. For example, the last reference numeral in the reference characters designating elements in stage 142 is two, and for stage 143, the last reference numeral in each reference character is three. To simplify the control counter circuit, only the details of stages 140, 141, and 142 have been shown. The remaining stages are illustrated in block diagrammatic form in FIGURE 3.

With continued reference to FIGURE 3, add ouput conductors AO–0, AO–1, AO–2, AO–3, AO–4, AO–5, AO–6, AO–7, AO–8, and AO–9 are respectively connected in parallel through blocking diodes *da*–0, *da*–1, *da*–2, *da*–3, *da*–4, *da*–5, *da*–6, *da*–7, *da*–8, and *da*–9, to an add bus 176. Similarly, subtract output conductors SO–0, SO–1, SO–2, SO–3, SO–4, SO–5, SO–6, SO–7, SO–8, and SO–9 are respectively connected in parallel through blocking diodes *ds*–0, *ds*–1, *ds*–2, *ds*–3, *ds*–4, *ds*–5, *ds*–6, *ds*–7, *ds*–8, and *ds*–9, to a subtract bus 178. The anode of switch 152–0 (FIGURE 6) is connected by a conductor 179–0 to a shunt bus 180. Add conductors AO–0 through AO–8 are respectively connected to the add input terminals 162–1 through 162–9, thus coupling the add output of each of the stages 140–148 to the add input of the next succeeding stage. Conductor AO–9 is connected to add input terminal 162–0 in stage 140 completing the ring for the units decade in counter 124.

Subtract output conductors SO–1, SO–2, SO–3, SO–4, SO–5, SO–6, SO–7, SO–8, and SO–9 are respectively connected to subtract input terminals 166–0, 166–1, 166–2, 166–3, 166–4, 166–5, 166–6, 166–7, and 166–8, thus coupling the subtract output of each of the stages 141–149 to the subtract input of the next preceding stage. Subtract output conductor SO–0 is connected to the subtract input terminal 166–9 of stage 149 completing the ring for the units decade in counter 124.

As shown in FIGURE 3, conductors 179–0, 179–1, 179–2, 179–3, 179–4, 179–5, 179–6, 179–7, 179–8, and 179–9 are all connected in parallel to shunt bus 180.

The operation of each stage 140–149 is the same so that only one will be described in detail for the present. Considering the second stage 141, a pulse of 0.8 volt is required to be applied at terminal 159–1 to turn on switch 152–1 for the circuit values shown in the drawings. When switch 152–1 is "on," current flows from the D.-C. voltage source at terminal 158–1 through resistor 156–1 to the gate anode of switch 152–1 and from shunt bus 180 to the anode of switch 152–1. The current flowing through switch 152–1 leaves the switch cathode and flows to ground. To turn switch 152–1 off a current shunt path in Schmitt trigger 136 is established in a manner to be presently described to reduce the current flow from the anode to the cathode of switch 152–1 to a value below the minimum magnitude needed to keep the switch on. This prevents current flow through the conductor connecting the gate anode of switch 152–1 to terminal 154–1.

Just prior to switching when switch 152–1 is on, the voltage drop across capacitor 170–1 is 6 volts for the circuit values shown in the drawings. Immediately after switching, the voltage drop across capacitor 170–1 remains the same, but with switch 152–1 turned off, the voltage at the positive and negative sides of capacitor 170–1 will be about 24 volts and 18 volts respectively.

In an add operation, resistor 156–1 and capacitor 170–1 cooperate to provide a resistance-capacitance coupling, and the time constant of this R-C coupling is such to apply a pulse of 0.8 volt at terminal 159–2 in stage 142 to turn switch 152–2 on. Consequently, each time a shunt path is established in driver 133 in an add operation, the stage in register 130 that is on is turned off, and the next succeeding stage is turned on.

In a subtract operation, capacitor 174–1 is charged when switch 152–1 is turned off to apply a voltage pulse of 0.8 volt to terminal 159–0 in stage 140.

When any one of the control switches 152–0, 152–1, 152–2, 152–3, 152–4, 152–5, 152–6, 152–7, 152–8, or 152–9 is on so that it is conducting, the impedance is such to apply a six volt signal to its associated readout conductor (RO–0, RO–1, RO–2, RO–3, RO–4, RO–5, RO–6, RO–7, RO–8, or RO–9). When any one of the switches 152–0, 152–1, 152–2, 152–3, 152–4, 152–5, 152–6, 152–7, 152–8, or 152–9 is off so that it is not conducting current, then the voltage signal applied to its associated readout conductor increases to 24 volts. Thus, when any one of the stages 140–149 is on, the voltage signal on its associated readout conductor will be about six volts while the voltage signals on the remaining readout conductors for those stages that are off will be 24 volts.

With reference now to FIGURES 3 and 7, add bus 176 and subtract bus 178 are respectively connected to the collectors of the two transistors 186 and 187 in a direction sensing bistable or flip-flop multivibrator 184. The emitters of transistors 186 and 187 are grounded as shown. Multivibrator 184 is conventional as shown, for example, in "Handbook of Selected Semiconductor Circuits," published by the United States Government Printing Office (1960) No. 0535863 and prepared by Transistor Applications Inc. for the Bureau of Ships, Department of the Navy.

The signal applied to add bus 176 by multivibrator 184 will be either +24 volts or 0 volts with the circuit values given in the drawings. The signal applied by multivibrator 184 to subtract bus 178 will be the complement of the signal applied to add bus 176; that is, if a 24 voltage signal is fed to add bus 176, the signal applied to subtract bus 178 will be zero volts. Conversely, if the signal at add bus 176 is zero volts, the signal fed to subtract bus 178 will be +24 volts. A positive input voltage signal applied either to the base of transistor 186 or to the base of transistor 187 will trigger multivibrator 184 in the usual manner and cause it to hold, applying a positive voltage signal of constant amplitude to either bus 176 or bus 178 until the direction of the signal produced by generator 100 is changed. As a result, the signal at the cathode terminals of diodes *da*–0, *da*–1, *da*–2, *da*–3, *da*–4, *da*–5, *da*–6, *da*–7, *da*–8, and *da*–9 will be either zero volts or +24 volts.

At the anode terminals of diodes *da*–0, *da*–1, *da*–2, *da*–3, *da*–4, *da*–5, *da*–6, *da*–7, *da*–8, and *da*–9 the signal will be either zero volts or at some value between +18 volts and zero volts if the charge on one of the capacitors 170 is charging up. If a signal of 24 volts is applied, for example, to the cathode of diode *da*–1, no current will flow through this diode to bus 176 with the result that current will be forced to flow through conductor AO–1 to the add input terminal 162–2 of stage 142.

If, however, the signal at the cathode of diode *da*–1 is zero volts, the anode of diode *da*–1 then will be more positive than the cathode since it will be either zero volts or at some value between zero and 18 volts. Under these conditions, current is shunted through diode *da*–1, thus preventing a signal from being applied to turn on stage 142. As a result, it is clear that the signal applied to add bus 176 by multivibrator 184 must be +24 volts in order to permit an add signal to be transferred to the input terminal of any stage for turning on the control switch in that stage. If the signal applied to add bus 176 is zero, no signal will be transferred to the add input terminals of any one of the stages 140–149 for turning it on.

If switch 152–1 is on and signals of +24 volts and zero volts are applied to add bus 176 and subtract bus 178 respectively, then, when driver 133 is triggered to establish a current shunt path for turning switch 152–1 off, the voltage at capacitors 170–1 and 174–1 will rise from 6 volts to 24 volts. Capacitor 174–1 will charge to 24 volts but this charge will not turn on switch 152–0 in stage 140 for two reasons. The first reason is that the anode of diode *ds*–1 will be more positive than cathode side since the latter is connected to subtract bus 178 which is presently at zero volts. As a result, current will be shunted through diode *ds*–1, and insufficient current will flow through conductor SO–1 for turning on switch 152–0. The second reason why switch 152–0 will not be turned on is because of a shortened time constant of the R-C coupling network due to the forward biasing of diode *ds*–1. The significance of this shortened time constant will become apparent as the description proceeds.

Under the foregoing conditions where the signals applied to add bus 176 and subtract bus 178 are respective 24 volts and zero volts, diode *da*–1 will block current flow to add bus 176, thus causing an add signal to be transferred to terminal 159–2 of stage 142. Accordingly, it is clear that multivibrator 184 is operative to permit either an add signal or a subtract signal to be transferred but not both at the same time.

With continued reference to FIGURE 7, trigger 136 comprises a conventional clipper circuit 190 and a one-shot multivibrator 191. The add and subtract pulses on conductors 108 and 106 respectively are separately fed through circuit 190 on conductors 192 and 193 and are applied to a conductor 194 which is connected to the base of a normally off transistor 196 in multivibrator 191. Trigger 136 is, essentially, a conventional circuit as shown, for example, in the previously mentioned "Handbook of Selected Semiconductors."

With continued reference to FIGURE 7, the emitter of transistor 196 is connected to ground. The collector of transistor 196 is connected through a pair of parallel branches 198 and 200 to a D.C. voltage source 201 in the usual manner. Branch 198 comprises an isolating diode 202 in series with a resistor 204. Shunt bus 180 is connected to branch 198 between diode 202 and resistor 204.

With the foregoing circuitry, it will be appreciated that either an add pulse or a subtract pulse appearing on conductor 194 will turn on transistor 196 to establish a current shunt path across all of the ten stages in register 130. This shunt path may be traced from source 201, through branch 198, and through transistor 196 to ground. The resistance in this shunt path between shunt bus 180 and ground at the emitter side of transistor 196 is less than the resistance to current flow from shunt bus 180 through the control switches 152 in any of the units stages 140–149. As a result, when transistor 196 is on, insufficient current will be applied through shunt bus 180 to keep the control switches 152 in stages 140–149 on.

The current shunt path through diode 202 and transistor 196 is maintained, as shown in FIGURES 8 and 9, for a period of about 25 microseconds for the circuit values shown in the drawings. Thus, stages 140–149 will be off for the same period of time. The time constant for each of the R-C networks in stages 140–149 is sufficiently longer than 25 microseconds that a 0.8 volt signal is applied to one of the terminals 159–0, 159–1, 159–2, 159–3, 159–4, 159–5, 159–6, 159–7, 159–8, or 159–9 at the end of 20 microseconds. For example, in transferring a signal from stage 141 to stage 142, a signal of 0.8 volt to turn switch 152–2 on is applied at terminal 159–2 at the end of 25 microseconds even though multivibrator 191 is still shunting all of the stages. When transistor 196 is turned off to remove the shunt across stages 140–149, however, the voltage applied to terminal 159–0 is not large enough to turn switch 152–0 on. To this end, it will be noted that only when capacitor 170–0 in stage 140 is charging is the voltage high enough to turn switch 152–1 on. In this example, however, only capacitor 170–1 is being charged and all the other capacitors in register 130 are essentially fully charged at this point in time. From the foregoing, it is clear that to effectively transfer an add or subtract signal, the time that multivibrator 191 shunts stages 140–149 must be correlated with the decay time of the R-C networks in each of the stages 140–149.

In addition to controlling the operation of the control switches in stages 140–149, trigger 136 reshapes the add and subtract pulses produced by generator 100 to reduce distortion of the waveform for assuring more dependable operation of counter 124.

As shown in FIGURE 7, the add output signal of circuit 190 is fed through a conductor 204 to the base of transistor 187 in multivibrator 184. Similarly, the subtract output signal of circuit 190 is fed through a conductor 206 to the base of transistor 186 in multivibrator 184. Thus, an add pulse produced by generator 100 triggers multivibrator 184 by turning transistor 187 on if it was not previously on with the result that the voltage on subtract bus 178 goes to zero while the voltage on add bus 176 goes to 24 volts. This permits a signal from the add output of one of the stages 140–149 to be routed to the add input of the next succeeding stage.

Similarly, a subtract pulse produced by generator 100 will trigger multivibrator 184 to reduce the voltage on add bus 176 to zero while raising the voltage applied to subtract bus 178 to 24 volts if these voltage conditions do not already exist. This permits a signal from the subtract output to be transferred from one of the stages 140–149 to the subtract input of the next preceding stage as previously explained.

Referring now to FIGURES 3 and 10, the carry signal from units register 130 is fed through readout conductor RO–9 to branch 208 to driver 134. Similarly, the borrow signal fed through readout conductor RO–0 is fed to a branch 210 in driver 134. Branches 208 and 210 are connected in parallel to one terminal of a resistor 212. The other terminal of resistor 212 is connected to the base of a transistor 214 in multivibrator 137.

With continued reference to FIGURE 10, each of the branches 208 and 210 comprises a resistor 216, a capacitor 218, and a blocking diode 220 all connected in series circuit relationship. A biasing network 222 connected to branch 208 comprises a pair of resistors 224 and 226. Resistor 224 has one of its terminals connected to a D.-C. voltage source of −6 volts and the other of its terminals connected to branch 208 between capacitor 218 and diode 220. Resistor 226 is connected to branch 208 with resistor 224 and provides a current path to ground in the manner shown. A biasing network 228 similar to network 222 is connected to branch 210 in the same manner that network 222 is connected to branch 208. Like elements in networks 222 and 228 are designated by the same reference numerals.

With continued reference to FIGURE 10, add bus 176 is connected through a blocking diode 230 to branch 208 between diode 220 and biasing network 222. Similarly, substract bus 178 is connected through a blocking diode 232 to branch 210 between biasing network 228 and diode 220.

With continued reference to FIGURE 10, the emitter of transistor 214 is connected to ground. The collector of transistor 214 is connected through a branch 233 to a D.-C. voltage source of +24 volts in the usual manner. Branch 233 comprises an isolating diode 234 and a resistor 236 connected in series in the manner shown. A shunt bus 180T for tens decade register 131 is connected to branch 233 between diode 234 and resistor 236.

Similar to the operation of multivibrator 191, either a positive add pulse or a positive subtract pulse will turn on transistor 214 so that it conducts to establish a current shunt path across register 131. This shunt path may be traced from the D.-C. voltage source through branch 233, and through transistor 214 to ground.

Referring now to FIGURE 4, the circuitry for the tens decade register 131 is the same as that described for the units decade register 130. Accordingly, like reference characters suffixed with a T have been used to designate like elements. Like register 130, register 131 comprises ten stages 140T, 141T, 142T, 143T, 144T, 145T, 146T, 147T, 148T and 149T respectively representing the digits 0, 1, 2, 3, 4, 5, 6, 7, 8, and 9 in the tens decade.

With continued reference to FIGURE 4, conductors 179–0T 179–1T, 179–2T, 179–3T, 179–4T, 175–5T 179–6T, 179–7T, 179–8T, and 179–9T are connected in parallel to shunt bus 180T. Add output conductors AO–0T, AO–1T, AO–2T, AO–3T, AO–4T, AO–5T, AO–6T, AO–7T, AO–8T, and AO–9T are respectively connected through blocking diodes *da*–0T, *da*–1T, *da*–2T, *da*–3T, *da*–4T, *da*–5T, *da*–6T, *da*–7T, *da*–8T, and *da*–9T to add bus 176, and subtract output conductors SO–0T, SO–1T, SO–2T, SO–3T, SO–4T, SO–5T, SO–6T, SO–7T, SO–8T, and SO–9T are respectively connected through blocking diodes *ds*–0T, *ds*–1T, *ds*–2T, *ds*–3T, *ds*–4T, *ds*–5T, *ds*–6T, *ds*–7T, *ds*–8T and *ds*–9T to subtract bus 178.

From the foregoing circuitry, it is clear that the current shunt path through diode 234 and transistor 214 to ground is across all ten stages 140T–149T of register 131. To trigger multivibrator 137 a +24 volt signal is fed through either conductor RO–9 or RO–0. If the trigger signal is on conductor RO–9, capacitor 218 in branch 208 will charge to about 24 volts with the circuit values shown in the drawings. The biasing voltages across diode 230 will shift, thus causing diode 230 to either permit or block current flow from branch 208 to add bus 176. If diode 230 blocks current flow to add bus 176, current then flows through the path of least resistance which is through resistor 212 to turn on transistor 214 and thereby establish a shunt across stages 140T–149T in register 131

The condition where stage 149 representing the digit 9 in the units decade is on and where generator 100 applies an add pulse to conductor 192 will now be considered. When stage 149 is on, the voltage at conductor RO–9 will be 6 volts as previously explained in the operation of register 130. The appearance of an add pulse on conductor 192 turns transistor 196 on to establish a current shunt path across stages 140–149 with the result that stage 149 will be turned off.

When stage 149 is turned off, the voltage of the signal on conductor RO–9 rises to +24 volts as previously explained with the result that the voltage drop across capacitor 218 in branch 208 will increase. Capacitor 218 in branch 208 will thus start to charge to provide a pulse at the terminal indicated at 252 in branch 208.

The add pulse appearing on conductor 192 in trigger 136 will also trigger multivibrator 184 unless transistor 187 was conducting to reduce the voltage on subtract bus 178 to zero volts while increasing the amplitude of +24 volts on add bus 176. Since the voltage at the anode of diode 230 is less than 24 volts, diode 230 will block current flow from terminal 252 to add bus 176. As a result, the positive current pulse in branch 208 is caused to flow through resistor 212 to turn transistor 214 on for a period of 15 microseconds. This operation renders transistor 214 conductive as previously explained to complete the current shunt circuit across stages 140T–149T in register 131. In response to the flip-flop operation of multivibrator 137, the "on" stage in register 131 is turned off and an add signal is transferred to turn on the control switch in the next succeeding stage in the manner explained earlier.

In a carry operation where stage 149 is on and an add pulse is produced by generator 100, it is clear that stage 149 will be turned off and stage 140 will be turned on. As a result, the signal on conductor RO–0 will go from +24 volts to +6 volts. When the signal on conductor RO–0 was +24 volts, capacitor 218 of branch 210 will have been charged to a steady state condition so that no current flows through diode 220 of branch 210 at this time. When, however, the voltage on conductor RO–0 drops to +6 volts, which is about 15 microseconds after the voltage signal on conductor RO–9 rises to +24 volts, capacitor 218 of branch 210 will discharge to provide a voltage of about −18 volts at the anode of diode 220 of branch 210. The voltage applied at the cathode of diode 220 in branch 210, however, will be no less than zero volts to block a signal from being fed through branch 210 to operate transistor 214.

When a further add pulse is produced by generator 100, stage 140 will be turned off and stage 141 will be turned on. As a result, the signal on conductor RO–0 will go from +6 volts to +24 volts. This voltage rise, however, will not operate transistor 214 since the voltage applied to subtract bus 178 will be zero volts thus providing a current path of least resistance through diode 232.

The operation of counter 124 where stage 140 is on so that a zero appears in the units decade register 130 and where a subtract pulse appears on conductor 193 in trigger 136 is essentially the same as the operation involving the transfer of an add pulse from register 130 to register 131. In subtracting it is clear, however, that the positive pulse for turning transistor 214 on is fed through branch 210.

Referring now to FIGURE 11, the circuitry for driver 135 for the hundreds decade register 132 is the same as that for driver 134. Accordingly, like reference numerals suffixed by the letter H have been employed to designate like circuit elements. Like driver 134, the shunt bus 180H is connected to the one-shot multivibrator circuit of driver 135 in the manner shown. Also, readout conductors RO–9T and RO–0T are respectively connected to branches 208H and 210H of driver 135 in the manner shown. Operation of driver 135 is the same as that described for driver 134.

Referring to FIGURE 5, the circuitry for register 132 is the same as that described for register 130. Accordingly, like reference characters suffixed by the letter H have been used to designate like circuit elements. As shown, stages 140H–149H respectively represent the digits 0, 1, 2, 3, 4, 5, 6, 7, 8, and 9 in the hundreds decade. Conductors 179–0H through 179–9H are connected in parallel to shunt bus 180H. Operation of register 132 is the same as that described for register 131.

Although counter 124 is described to have only three decades, it will be appreciated that additional registers may be used to provide as many decades as needed.

The number of pounds designated by each of the smallest divisions on scale 84 is called the scaling or multiplication factor. In the present embodiment, the scale factor is equal to 1 since one pound corresponds to one division on scale 84. As a result, the digital readout for each decade in counter 124 will be 0, 1, 2, 3, 4, 5, 6, 7, 8, and 9. In the tens and hundreds decade drivers 134 and 135, this scaling factor requires a carry for the nine and a borrow for the zero. These carry and borrow operations are accomplished by the circuit branches 208, 210, 208H, and 210H in the circuits for drivers 134 and 135.

If it is desired to increase the scaling factor, then additional carry and borrow branch circuits are needed in drivers 134 and 135. To illustrate the modifications that are needed in counter 124 where it is desired to increase the scaling factor for example, factors of 2 and 3 will be considered. To increase the scaling factor to 2 or 3, it is first required to rename the digits in each decade. This is shown in the following table:

Scaling Factor

| | | | | | | | | | | |
|---|---|---|---|---|---|---|---|---|---|---|
| 1 | 0 | 1 | 2 | 3 | 4 | 5 | 6 | 7 | 8 | 9 |
| 2 | 0 | 2 | 4 | 6 | 8 | 0 | 2 | 4 | 6 | 8 |
| 3 | 0 | 3 | 6 | 9 | 2 | 5 | 8 | 1 | 4 | 7 |

For a scaling factor of 2, it will be noted that the above table that two carries and two borrows are needed for the two eights and the two zeros respectively. To accomplish these carry and borrow operations, only the circuit for driver 134 and the connections between register 130 and driver 134 are required to be modified in the manner shown in FIGURE 14.

Referring to FIGURE 14, it will be noted that the circuitry for register 130 is the same as that shown in FIGURE 4, and that only the digits for stages 140–149 have been renumbered to correspond to the foregoing scaling factor table. As shown, the circuit of driver 134 has been modified by adding a carry branch 253 and a borrow branch 254 which are connected as an OR with branches 208 and 210 to resistor 212. Both branches 253 and 254 comprise the same circuit elements contained in branches 208 and 210, and to this extent, like reference characters have been used to designate like parts. Add bus 176 is connected through a blocking diode 256 to the anode of diode 220 of branch 253. Diodes 256 and 230 are connected to add bus 176 as shown.

Similarly, subtract bus 178 is connected through a diode 258 to the anode of diode 220 of branch 254. In this embodiment, it will be noted that readout conductor RO–4T is connected to branch 253 and readout conductor RO–5T is connected to branch 254. This circuit provides for the two carry operations and the two borrow operations needed for a scaling factor of two in a manner similar to that described for the circuit shown in FIGURE 10.

If it is desired to increase the scaling factor to three so that three pounds correspond to each of the increments on scale 84, it will be appreciated from the foregoing that three carry branch circuits in driver 134 are required for the digits 9, 8 and 7 shown in the foregoing scaling factor table. Similarly, three borrow branch circuits in driver 134 are needed for the digits 0, 2, and 1. These add and borrow branch circuits will be the same as branches 208 and 210 respectively.

From the foregoing, it will be appreciated that with the counter circuit of this invention, the scaling factor is easily changed simply by providing for a corresponding number of add and borrow branch circuits in drivers 134 and 135 and by making the proper connections to the readout conductors of the preceding decade.

*Weight selection and set-up circuit*

Referring now to FIGURES 15 and 15A, weight selection circuit 126 for entering a selected plural order digit into counter 124 is shown to comprise three selection switch assemblies 260, 261, and 262 for operating registers 130, 131, and 132 respectively. Switch assembly 260 comprises a pair of tap type selection switches 263 and 264. Similarly, assemblies 261 and 262 respectively comprise a pair of tap type switches 256 and 266 and a pair of tap type switches 267 and 268. Switches 263–268 may be of any conventional form.

With continued reference to FIGURE 15, switch 263 essentially comprises a contact arm 269 which is connected to a bus and which is selectively shiftable to successively engage a series of ten electrically independent contacts 270, 271, 272, 273, 274, 275, 276, 277, 278, and 279. Switch 264 is preferably of the same construction as switch 263. Accordingly, like reference characters have been employed to designate like parts of switches 263 and 264.

As shown, the contacts 270–279 of switches 263 and 264 are respectively connected in parallel to conductors I–0, I–1, I–2, I–3, I–4, I–5, I–6, I–7, I–8, and I–9. Current is selectively supplied to either of the contact arms 269 of switches 263 and 264 by a stepping control switch 282, and arms 269 are selectively positioned to feed current through one of the conductors I–0 through I–9 for applying a voltage signal to turn on one of the control switches in stages 140–149.

With continued reference to FIGURE 15, switches 265–268 are of the same construction as switches 263 and 264. Accordingly, like parts in switches 265 and 266 have been designated by like reference numerals suffixed with the letter T, and like parts in switches 267 and 268 have been designated by like reference numerals suffixed with the letter H.

As shown in FIGURE 15, contacts 270T–279T of switches 265 and 266 are respectively connected in parallel to conductors I–0T, I–1T, I–2T, I–3T, I–4T, I–5T, I–6T, I–7T, I–8T, and I–9T. Similarly, contacts 270H–279H of switches 267 and 268 are respectively connected in parallel to conductors I–0H, I–1H, I–2H, I–3H, I–4H, I–5H, I–6H, I–7H, I–8H, and I–9H.

Current is fed through either of the contact arms 269T of switches 265 and 266 and also through either of the contact arms 269H of switches 267 and 268 by control switch 282. As a result, switches 265 and 266 may be independently and selectively set to apply a voltage signal for turning on one of the control switches in stages 140T–149T. Similarly, switches 267 and 268 may be independently and selectively set to apply a voltage signal for turning on one of the control switches in stages 140H–149H. Control switch 282 is then stepped in a manner to be described in detail later on to first simultaneously connect a D.-C. voltage source to the contact arms of switches 263, 265, and 267 for a purpose as will presently appear. When control switch 282 is stepped to its next position, the D.-C. voltage source will then be capable of being connected simultaneously to the contact arms of switches 264, 266, and 268. With this weight selection switching arrangement, it is clear that switches 263, 265, and 267 may be set for the desired weight of a first ingredient to be fed to hopper 38, and switches 264, 266, and 268 may be selectively set for the desired weight of a second ingredient.

As a result, it is clear that the weight set-up switching arrangement thus far described permits the independent weight selection of up to two ingredients. If it is desired to set up weight selections for more than two ingredients, it is clear that a corresponding additional number of weight selection switches are needed.

With continued reference to FIGURE 15, control switch 282 comprises three switch decks 283, 284, and 285 for respectively selecting the units, tens, and hundreds information media set up in switches 263–268. Deck 283 comprises a movable contact arm 286 successively engageable with a series of electrical independent contacts in a bank 287. In this embodiment of the invention, bank 287 is shown to have eleven contacts respectively indicated by the position numbers 1 through 11. The contacts in bank 287 corresponding to positions 1 and 2 are respectively connected by conductors 288 and 289 to the contact arms 269 of switches 263 and 264. The remaining contacts in bank 287 are provided to permit the further selection switches to be added to switch assembly 260 where it is desired to feed more than two ingredients to hopper 38 in a single weighing cycle.

With continued reference to FIGURE 15, decks 284 and 285 are of the same construction as deck 283. Accordingly, like parts in deck 284 have been identified by like reference numerals suffixed by the letter T, and like parts in deck 285 have been designated by like reference numerals suffixed by the letter H. As shown, contact arms 286, 286T, and 286H are ganged for unitary movement by a linkage schematically indicated at 290.

Referring now to FIGURES 15 and 15A, contact arms 286, 286T and 286H are respectively connected by conductors 291, 292, and 293 to isolating diodes 294, 295, and 296 in a resistance-capacitance coupling network 297. Network 297 comprises a resistor 298 and a capacitor 299 connected in series. Capacitor 299 is connected through a set of normally open relay contacts R6–1 to a D.-C. voltage source 300 of 24 volts. Contacts R6–1 are actuatable by means to be presently described to connect and disconnect supply source 300 with respect to switch assemblies 260, 261, and 262.

With continued reference to FIGURE 15A, a branch circuit 302 connected to source 300 in parallel with network 297 comprises a capacitor 304, a blocking diode 306, and a resistor 308 all connected in series. One terminal of capacitor 304 is connected to source 300 through contacts R6–1, and diode 306 is connected between capacitor 304 and resistor 308. Current from source 300 is fed through branch 302 to the base of a transistor 310 in a one-shot multivibrator 312. A suitable biasing network 314 is preferably connected to branch 302 between capacitor 304 and diode 306 in the manner shown.

With continuing reference to FIGURE 15A, the collector of transistor 310 is connected through an isolating diode 315 and a resistor 316 to a D.-C. voltage source 318 of +24 volts. The emitter of transistor 310 is connected directly to ground. With continued reference to FIGURES 2 and 15A, shunt buses 180, 180T, and 180H are respectively connected to the anodes of isolating diodes 322, 323, and 324 by conductors 319, 320, and 321. The cathodes of isolating diodes 322, 323, and 324 are connected to the collector of transistor 310.

Similar to the operation of the one-shot multivibrators in drivers 134 and 135 a positive pulse at the base of transistor 310 is needed to turn transistor 310 on. When transistor 310 is conducting, a current shunt path is established across all the stages in registers 130, 131, and 132. When transistor 310 is off, the current shunt path through transistor 310 to ground is interrupted.

When any of the multivibrators 191, 137, or 138 are triggered to establish a current shunt path across their respective registers, the current from source 318 will flow to ground through the transistor shunt paths in mulitivibrators 191, 137, and 138 instead of flowing through the stages in registers 130, 131, and 132. This prevents any of the stages from being turned on by the voltage at source 318 to cause a false count to appear in counter 124.

When transistor 310 is turned on, shunt buses 180, 180T, and 180H are all connected to ground, and the voltage on the collector of transistor 310 and consequently, on buses 180, 180T, and 180H will go to zero.

In operation of circuit 126, switches 263–268 are selectively set to the desired weights of two materials about to be introduced into weigh hopper 38 and contacts R6–1 are closed by means to be presently described. For the switch settings shown in FIGURE 15, a weight of 248 pounds has been selected for the first ingredient and a weight of 104 pounds has been selected for the second ingredient. When control switch 282 is now stepped to its first position, conductors I–2H, I–4T, and I–8 will be connected in parallel to coupling network 297 in circuit 126. When contacts R6–1 are closed, capacitors 299 and 304 will be charged from source 300. As a result, capacitor 304 will provide a positive pulse which is fed through diode 306 and resistor 308 to turn on transistor 310, thus connecting shunt buses 180, 180T, and 180H to ground as previously explained. The waveform on the collector of transistor 310 when transistor 310 is turned on is shown in FIGURE 16.

As a result of connecting shunt buses 180, 180T, and 180H to ground, the voltages on these buses will go to zero as previously explained so that all the stages in registers 130, 131, and 132 are shunted and thereby turned off. The time constant of multivibrator 312 is such that the voltage on buses 180, 180T, and 180H will remain at zero for about 100 microseconds, thus allowing ample time for steady state conditions to be reached in each of the stages of registers 130–132. To this end, it will be recalled that the time constant for the various stages in registers 130–132 is 20 to 40 microseconds.

Simultaneously with the charging of capacitor 304, capacitor 299 is also charged when contacts R6–1 are closed to provide a positive pulse which is shown in FIGURE 16A. This pulse is transmitted by switches 263, 265, and 267 to the selected readout conductors, which in FIGURE 15 are shown to be conductors I–2H, I–4T, and I–8. The positive pulses fed through conductors I–8, I–4T, and I–2H are respectively applied to terminals 159–8, 159–4T, and 159–2H to turn on stages 148, 144T, and 142H only, with the result that the plural digit number 248 is forced into counter 124. It will be noted from FIGURE 16A that the amplitude of this pulse after the lapse of 100 microseconds will be about 0.8 volt which is sufficient to turn on the control switches of the selected stages.

After the period of 100 microseconds has elapsed, transistor 310 will be turned off to cause a positive voltage to again be applied to shunt buses 180, 180T, and 180H. This signal alone, however, will not turn on any of the stages in registers 130–132.

Feeder motors 32 and 48 for delivering the first material to weigh hopper 38 are then energized by a sequencing and switching circuit 326 (FIGURE 1) in a manner to be explained later on in detail. Dial pointer 88 will now move up the scale as the first material is fed to hopper 38. For each pound of material fed to hopper 38, generator 100 will produce a subtract pulse to start the count-down operation of counter 124 from the plural order digit 248. The plural order digit forced into counter 124 by circuit 126 together with the progressive count down as material is fed to hopper 38 will be displayed by readout device 127 in a manner to be described later on.

When the ordered amount of the first material is delivered to weigh hopper 38, switching circuit 326 is operable in a manner to be explained later on to deenergize motors 32 and 48 and close catch gates 73 and 77 thus cutting off the feed of the first material. Circuit 326 is then operable to step control switch 282 to its second position where conductors I–1H, 1–0T, and I–4 are connected to network 297 in circuit. In the same manner as explained in connection with the delivery of the first material, the closure of contacts R6–1 will now cause signal pulses to be applied to conductors I–1H, I–0T, and I–4, thereby turning on the control switches in stages 141H, 140T, and 144 to enter the plural order digit 104 into counter 124. Motors 32*a* and 48*a* will now be energized to deliver the second material to hopper 38, thus causing the count down from the plural order digit 104.

In place of switches 263–268, it will be appreciated that various other selector devices may be employed such as, for example, relays, different types of switches including stepping switches, punch card readers, pegboards, and programmed computers.

*Dribble feed circuit*

In order to reduce the feed rate of material to hopper 38 from a full flow rate to a dribble flow rate at a selected point during the weighing cycle for each material, a dribble feed selector circuit 328 is provided in weight controller 104 as shown in FIGURE 17. Circuit 328 comprises a pair of selector switch assemblies 329 and 330 for respectively setting the dribble points for two materials which are to be delivered to hopper 38. Switch assembly 329, according to this embodiment, comprises two tap-type switches 331 and 332.

As shown in FIGURE 17, switch 331 has a contact arm 333 which is selectively movable for successively engaging ten electrically independent contacts in a bank 334. Switch 332 also has a contact arm 335 that is selectively movable for successively engaging ten electrically independent contacts in a bank 336. The corresponding contacts of banks 334 and 336 are respectively connected in parallel to readout conductors RO–0, RO–1, RO–2, RO–3, RO–4, RO–5, RO–6, RO–7, RO–8, and RO–9 in the manner shown.

With continued reference to FIGURE 17, switch assembly 330 is preferably of the same construction as switch assembly 329. Accordingly, like reference numerals suffixed with the letter T have been used to identify like parts of assembly 330. As shown, the corresponding contact of banks 334T and 336T are respectively connected in parallel to readout conductors RO–0T, RO–1T, RO–2T, RO–3T, RO–4T, RO–5T, RO–6T, RO–7T, RO–8T, and RO–9T. Since the full flow feed rate of material is normally reduced to the dribble feed rate at some weight that is within 100 pounds of the selected batch weight to be weighed out, a switch assembly for the hundreds decade is not needed with the circuit of this invention.

With continued reference to FIGURE 17, control switch 282 is provided with two further decks 337 and 338 for feeding current through contact arms 333 and 33T or through contact arms 335 and 335T. Deck 337 comprises a movable contact arm 339 successively engageable with a series of electrically independent contacts in a bank 340. In this embodiment, bank 340 is shown to have eleven contacts respectively indicated by the position numbers 1 through 11. The contacts in bank 340 corresponding to positions 3 through 11 are not connected in circuit 328, but are provided to permit the addition of further selector switches where it is desired to feed more than two ingredients to hopper 38 in a single weighing cycle. The contacts corresponding to the first two positions in bank 340 are respectively connected to contact arms 333 and 335 by conductors 341 and 342.

Deck 338 is of the same construction as deck 337. Accordingly, the parts in deck 338 which are the same as those in deck 337 have been identified by like reference numerals suffixed with the letter T. As shown, contact arms 339 and 339T are coupled for unitary movement by linkage 290. By counting down from a selected weight, it is clear, as previously mentioned, that the dribble point where the full flow feed rate is reduced to the dribble feed rate will occur at some count less than the weight selection, but more than the final cut-off and/or the appearance of all zeros in counter 124. Thus, contact arms 339 and 339T are respectively AND connected through diodes 343 and 344 to one terminal 345 of a resistor 346. Readout conductor RO–0H corresponding to the zero in the hundreds decade and an anti-ambiguity conductor 348 are respectively AND connected through diodes 349 and 350 to terminal 345.

Conductor 348, as shown in FIGURE 7, is connected to the collector of a second transistor 351 in multivibrator 191. The emitter of transistor 351 is connected to ground, and the collector of transistor 351 is connected through a resistor 352 to source 201. In the flip flop operation of multivibrator 191, transistor 351 is on when transistor 196 is off. Conversely, transistor 351 will be off when transistor 196 is on. When transistor 351 is on, current is conducted through its emitter to ground so that essentially zero voltage will be applied to its collector and therefore the conductor 348. When transistor 351 is turned off, indicating that transistor 196 is on to provide a current shunt path across all the stages in units register 130, a positive voltage signal approaching 24 volts is applied to conductor 348. Thus, when the multivibrator current shunt path across the stages in register 130 is established a positive voltage signal is fed through conductor 348, and conversely, when this current shunt path is interrupted, the voltage on conductor 348 goes to zero. As will become presently apparent, the presence of a positive voltage signal on conductor 348 will prevent dribble feed circuit 328 from reducing the material flow rate at an undesired false count.

Referring to FIGURE 17 again, the other terminal 354 of resistor 346 is connected to the base of a transistor 355 in a relay energizing network 356. Terminal 354 is also connected to one terminal of a resistor 357. The other terminal of resistor 357 is connected to ground, to one terminal of resistor 358, and to the cathode terminal of a silicone controlled current conducting switch 359. The emitter of transistor 355 is connected to a D.-C. voltage source 360 of 6 volts, and the collector of transistor 355 is connected to a resistor 361 which is in series with resistor 358 to provide a current path from source 360, through transistor 355, and through resistors 361 and 358 to ground. The anode terminal of switch 359 is connected to one terminal of a control relay R2 which has its other terminal connected through a set of normally closed contacts R6–2 to a D.-C. voltage source 362 of +24 volts. An arc suppression diode 363 is shunted across relay R2 in the manner shown.

With continued reference to FIGURE 17, the cathode gate of switch 359 is connected to the common terminal between resistors 358 and 361. The anode gate of switch 359 is connected to the conductor between the switch anode and relay R2. Switch 359 is of the type that will lock in its on position provided that a signal of 0.8 volt or greater is applied to its gate cathode and a current path between source 362 and ground can be established. This requires contacts R6–2 to be closed when the turn-on signal appears at the gate cathode if switch 359 is to lock in its on position.

In network 356, any voltage signal applied to the base of transistor 355 that is less than 6 volts will turn transistor 355 on with the circuit values shown in the drawings. When transistor 355 is on, current is permitted to flow from source 360 and through resistor 361 to turn switch 359 on. The voltage drop across resistor 358 is such that there is sufficient voltage available for turning switch 359 on when transistor 355 is on. By turning on control switch 359, a circuit from source 362 to ground is completed to energize relay R2 which, when energized, is operative in a manner to be presently described to reduce the material flow rate to hopper 38 from full flow rate to dribble flow rate.

With continued reference to FIGURE 17, resistors 346 and 357 which are connected in series between terminal 345 and ground constitute a voltage divider network. In this embodiment, resistors 346 and 357 are preferably of the same value so that the voltage drops across these resistors are equal. Thus, if a signal of 24 volts is applied to terminal 345, a voltage signal of 12 volts will be applied to terminal 354 and consequently to the base of transistor 355. This voltage signal being more than 6 volts prevents transistor 355 from being turned on with the result that relay R2 will remain deenergized. When, however, the voltage at terminal 345 is reduced to 6 volts, a voltage signal of 3 volts will be applied to the base of transistor 355 to thereby turn transistor 355 on and energize relay R2. As a result, it is clear that the energization of relay R2 is dependent on the voltage signal applied to terminal 345.

With the signal input connections to circuit 328, it will be noted that four signals are applied to terminal 345 through conductor 348, conductor RO–0H, switch arm 339 and switch arm 339T. By the shown arrangement of diodes 343, 344, 349, and 350, an AND circuit connection is provided. With the control counter circuit previously described, it is clear that one of two positive voltage signals will be fed through diodes 343, 344, and 349. The lower signal will essentially be 6 volts for the circuit values shown in the drawings. The higher signal will be 24 volts less any voltage drops across the resistances in the circuit of counter 124. For describing the operation of circuit 328, however, the higher signal will be considered to be 24 volts.

A voltage signal of 6 volts appearing on contact arm 339 indicates that the units register stage associated with the readout conductor connected to arm 339 is on. A voltage signal of 24 volts on arm 339 indicates that the units register stage associated with the readout conductor connected to arm 339 is off. The same conditions exist with respect to the voltage signals applied to switch contact arm 339T.

Similarly, voltage signals of 6 volts fed to diode 349 that stage 140H representing the zero in the hundreds decade is on. If the voltage signal fed to diode 349 is 24 volts, then stage 140H is off. This means that a stage in hundreds register 132 representing a digit other than zero is on.

A voltage signal approaching zero volts on conductor 348 indicates that the multivibrator current shunt circuit through transistor 196 is interrupted. A signal approaching 24 volts, on the other hand, indicates that this current shunt circuit through transistor 196 is established. For describing the operation of circuit 328 the higher signal fed through conductor 348 will be considered to be 24 volts.

If a voltage signal of +24 volts is fed through one of the diodes 343, 344, 349, or 350, then this signal will be applied to terminal 345 and also to the cathodes of the other diodes to establish a reverse bias condition. For example, if the signals at diodes 344, 349, and 350 are all 6 volts or less and the signal fed to diode 343 is +24 volts, then the +24 volt signal is applied to the cathodes of diodes 344, 349, and 350 to cause a reverse bias condition and thereby prevent current from flowing through diodes 344, 349, and 350 to terminal 345. Thus, the 24 volt signal is applied to terminal 345, and this signal is too large to turn transistor 355 on. As a result, relay R2 will remain deenergized.

From the foregoing, it will be appreciated that all the signals fed through diodes 343, 344, 349, and 350 are required to be 6 volts or less in order to turn transistor 355 on for energizing relay R2. If one or more of these signals is +24 volts, relay R2 will not be energized.

Thus, it is apparent that with respect to the first ingredient fed to hopper 38 four conditions must exist in order to facilitate the energization of relay R2: The readout conductor whose stage in units register 130 is on must coincide with switch contact arm 333, the readout conductor whose stage in the tens register 131 is on similarly must coincide with switch contact arm 333T, stage 140H representing zero in the hundreds decade must be on, and the current shunt circuit through transistor 196 in multivibrator 191 must be interrupted. The last condition is needed since when the shunt circuit through transistor 196 is established, false counts may momentarily appear in counter 124 to objectionably cause the energization of relay R2. For example, in counting down from 010 to 009, it is possible for a false count of 000 or 019 to momentarily appear while the shunt circuit through transistor 196 is established. Thus, if the dribble point were set at 019, relay R2 would be energized prematurely to start the dribble feed. This objectionable condition is precluded by the provision of conductor 348 and diode 350.

A set of four conditions similar to those mentioned above also must exist when control switch 282 is stepped to its second position to initiate the delivery of a second material to hopper 38.

Considering the previous example in which the desired amount of the first material to be weighed out was 248 pounds, it will be recalled that this plural order digit was entered into counter 124 by selective operation of switches 263, 265, and 267, and that the feed motors 32 and 48 were then energized to begin the delivery of material at a full flow feed rate to hopper 38. As a result, generator 100 will produce one subtract pulse for each pound of material fed to hopper 38 so that the plural order digit appearing in counter 124 will be progressively reduced from 248 to 247 to 246 and so on.

If it is now desired to stop the full flow feed rate and maintain the dribble feed rate when the weight in hopper 38 reaches 226 pounds, then switch contact arm 333 is selectively shifted to engage the switch contact connected to readout conductor RO–2, and switch contact arm 333T is selectively shifted to the switch contact connected to readout conductor RO–2T. With this selector switch setting the dribble feed will begin when the count in counter 124 is reduced to 22 so that the remaining 22 pounds of the desired 248 pounds will be delivered to hopper 38 at the dribble feed rate.

As material continues to be fed to hopper 38, therefore, the count of 22 will then be reached when 226 pounds have been received in the hopper. At this point, all of the conditions needed to apply a 6 volt signal to terminal 345 for energizing relay R2 will be satisfied. Energization of relay R2 will stop feed motor 32, but will allow feed motor 48 to continue to run in a manner to be presently described in detail.

Owing to the count-down mode of operation of counter 124, it is possible under many conditions to eliminate the need for switches 332, and 332T, and to use only one set of switches for setting the dribble point in successively feeding a plurality of ingredients to hopper 38. To this end, switches 331 and 331T could be set to start the dribble feed of the first delivered material when the weight in hopper 38 is 22 pounds lighter than the ordered weight as explained in the previous example. When the second material is delivered to hopper 38, this dribble feed switch setting need not be changed and the last 22 pounds of the second material will also be delivered to hopper 38 at a dribble feed rate.

The foregoing mode of operation is not possible if counter 124 were operated on a count-up basis. For example, if 248 pounds and 200 pounds are respectively selected as the weights for two materials and it was desired in obtaining fast but accurate weight measurements to feed the last 22 pounds of the first material at a dribble feed rate, then the dribble point in a count-up operation would have to be set for 226 pounds for the first material. This setting of 226 pounds, it will be noted, would not be reached in the course of weighing in only 200 pounds of the second ingredient. Even where the ordered weight of the second ingredient is more, say 230 pounds, the dribble point of 226 pounds would leave at best only four pounds to be delivered at the dribble flow rate. For purposes of obtaining accurate weight measurements, this would be unsatisfactory. Accordingly, a count-up operation clearly requires separate sets of dribble selector switches for each material delivered to hopper 38, whereas, with the present invention, the additional switches are frequently not essential for adjusting the dribble point.

*Compensation selector circuit*

In compensating for the various time lag inherent in the weighing apparatus previously described, weight controller 104 is provided with a compensation selector circuit 366 which is the same as dribble feed circuit 328. In addition, the circuit connections to circuit 366 are the same as those described for circuit 328. Accordingly, like reference characters have been used to designate like elements in circuits 328 and 366 except that in circuit 366, the reference characters are suffixed with a *c*.

Operation of circuit 366 is also the same as that described for circuit 328. For example, where the ordered weight of the first material is 248 pounds, it may be desired to generate a final cut-off signal when the weight sensed by scale 84 reaches 245 pounds. To accomplish this, switches **331*c* and 331T*c*** are set to cause energization of relay R2*c* when the count in counter 124 reaches 003 since it will be recalled that counter 124 is operating on a count-down, rather than count-up basis. Thus, switch contact arm **333*c* must be selectively shifted to engage the switch contact connected to readout conductor RO–3, and switch contact arm 333T*c* must selectively shifted to engage the switch contact connected to readout conductor RO–0T. When the count of 003 now appears in counter 124, all conditions necessary to apply a sufficiently low voltage to terminal 354*c* will be satisfied. As a result, transistor 355*c* will be turned on to supply current to turn control switch 359*c* on. When switch 359*c* is turned on, a circuit is completed for energizing relay R2 in the same manner as described in circuit 328**. Energization of relay R2*c* will then stop dribble feed motor 48 and close catch gate 77 in a manner to be described in detail later on.

*Overweight and underweight checking circuit*

Referring now to FIGURE 19, checking circuit 128 comprises six tap-type selector switches 370, 371, 372, 373, 374, and 375. Switches 370–375 permit the selection of tolerance limits within overweight and underweight ranges of 0 to 99 pounds which is adequate for the usual operating conditions encountered in practice.

Switch 370 is employed to select the underweight limit in the units decade and comprises a set of ten contact arms 377, 378, 379, 380, 381, 382, 383, 384, 385, and 386 which are selectively movable as a unit and which are connected in parallel to a bus 388. Contact arms 377–386 are movable into progressive and accumulative engagement with a bank 389 comprising ten electrically independent switch contacts which are respectively connected through diodes 390 to readout conductors RO–0, RO–1, RO–2, RO–3, RO–4, RO–5, RO–6, RO–7, RO–8, and RO–9. Thus, when arm 377 is connected to conductor RO–0, the circuit paths from conductors RO–1 through RO–9 to bus 388 are interrupted. When contact arms 377–386 are shifted to their next position where arm 377 engages the next contact of switch 370, arm 377 then will be connected to conductor RO–1. Similarly, in the next position of contact arms 377–386, arms 377, 378, and 379 will be connected to conductors RO–2, RO–1, and RO–0 respectively. Progressing to the final position of switch 370, contact arms 377, 378, 379, 380, 381, 382, 383, 384, 385, and 386 will respectively be connected to conductors RO–9, RO–8, RO–7, RO–6, RO–5, RO–4, RO–3, RO–2, RO–1, and RO–0, thus establishing electrical continuity between all of these conductors and bus 388.

As shown in FIGURE 19, switch bus 388 is connected to a D.-C. voltage source 393 of 24 volts through a resistor 394 and to the anode of a diode 396. The cathode of diode 396 is connected to a terminal 398 which, in turn, is connected to the cathode of a diode 400 and to ground through resistor 402. The anode of diode 400 is connected to the base of a transistor 404 in a relay energizing circuit 406. A D.-C. voltage source 407 of 24 volts is connected through a resistor 408 to the base of transistor 404 and also to the anode of diode 400.

Transistor 404 is turned on by applying a voltage signal of less than 12 volts to its base for the circuit values shown in the drawings. If a signal of more than 12 volts is applied to its base, transistor 404 will be turned off. As will be described in detail later on, a relay R3 is energized when transistor 404 is on and is deenergized when transistor 404 is off provided a set of contacts DST–1 is closed. If the weight of material received in hopper 38 is within an acceptable preselected tolerance, a signal of less than 12 volts is applied to turn on transistor 404.

If the weight of material sensed by scale 84 is too heavy or too light, on the other hand, a signal greater than 12 volts is applied to prevent transistor 404 from being turned on. The manner in which an acceptable or nonacceptable signal is applied to the base of transistor 404 will be explained as the description of circuit 128 proceeds.

With the circuitry described for switch 370, the voltage at the cathodes of diodes 390 in any readout conductors connected to bus 388 will determine whether current from source 393 flows back through switch 370 and diodes 390 or through resistor 402 to ground. If, for example, switch 370 is positioned so that readout conductors RO–0, RO–1, RO–2, RO–3, RO–4, RO–5, and RO–6 are connected to bus 388, and the digit in units register 130 is 7, then the signal fed through conductors RO–0 will be such that the least path of resistance for current from source 393 is through resistor 402 to ground. This increases the bias at the cathode of diode 400 to resist current at source 407 from flowing to ground of transistor 402. As a result, voltage applied to the base of transistor 404 will be sufficiently high to prevent transistor 404 from being turned on provided other conditions are not satisfied.

If the digits in units register 130 is decreased to 6, then the signal fed to conductor RO–6 will be 6 volts since stage 146 is now on. When stage 146 is on, the bias of diode 390 in conductor RO–6 is reversed and current from source 393 will then flow through switch 370 and conductor RO–6. This bias will have the effect of reducing the bias at terminal 398 if other conditions to be described are satisfied. Under this condition, resistors 408 and 402 provide a voltage divider network to permit some current from source 407 to flow through diode 400 to ground, thereby reducing the voltage applied to the base of transistor 404. This, however, will not be sufficient to turn transistor 404 on unless further conditions to be described become acceptable.

With continued reference to FIGURE 19, switches 372 and 373 are operated to select the underweight limit in the tens decade. Switch 372 is provided with only one selectively shiftable contact arm 416 which is connected to a bus 418 for successively engaging ten electrically independent contacts in a bank 420. The contacts in bank 420 are respectively connected through diodes 422 to readout conductors RO–0T, RO–1T, RO–2T, RO–3T, RO–4T, RO–5T, RO–6T, RO–7T, RO–8T, and RO–9T as shown.

As shown in FIGURE 19, switch bus 418 is connected to the cathode of a blocking diode 424. The anode of diode 424 is connected to a D.-C. voltage source 425 of +24 volts through a resistor 426 and to the anode of another blocking diode 428. The cathode of diode 428 is connected to terminal 398 in the manner shown.

If switch 372 is selectively positioned so that, for example, the conductor RO–2T is connected to bus 418, and the digit in tens register 131 is 4, the voltage signal fed through conductor RO–2T will be 24 volts. This has the effect of biasing diode 422 in conductor RO–2T to cause current from source 425 to flow through resistor 402 to ground. When stage 142T is on, however, register 131 applies a 6 volt signal to readout conductor RO–2T with the result that the bias of diode 422 will be reversed, permitting current from source 425 to flow through switch 372.

As shown in FIGURE 19, readout conductor RO–0H is connected to the cathode of a diode 432. The anode of diode 432 is connected to the anodes of two other diodes 434 and 436 and also to a D.-C. voltage source 438 of 24 volts through a resistor 440. The cathode of diode 434 is connected to terminal 398.

If stage 140H in the hundreds register 132 is off, a 24 volt signal is fed through conductor RO–0H to bias diode 432 in such a way as to cause current from source 438 to flow to ground through resistor 402. When stage 140H is turned on, however, indicating that there is a zero in the hundreds decade, then the signal applied to conductor RO–0H reduces to 6 volts as previously described. As a result, the bias of diode 432 will be reversed, permitting current from source 438 to flow through this diode.

From the foregoing, it is clear that the three branch connections to terminal 398 provide an AND network where a 24 volt signal fed through any one of the branches will bias diode 400 in such a way as to oppose current at source 407 from flowing through resistors 408 and 402 to ground.

Thus, transistor 404 will be turned on by a signal fed through diode 400 only when all of the three following acceptable conditions exist:

(1) When the count in the hundreds decade is zero;
(2) When the signal applied to any of the units readout conductors (RO–0 through RO–9) connected to switch bus 388 goes to six volts indicating that its associated counter stage is on; and (3) When the signal applied to any one of the tens readout conductors (RO–0T through RO–9T) connected to switch bus 418 goes to 6 volts, indicating that its associated counter stage is on.

If, for example, it is desired to set the underweight limit at 3 pounds so that any weight which is up to 3 pounds lighter than the desired, ordered weight will be acceptable, switch 370 is positioned to connect readout conductors RO–0, RO–1, RO–2, and RO–3 to bus 388, and switch 372 is positioned to connect readout conductors RO–0T to bus 418. As a result, any number in counter 124 in the range of 000 to 003 will establish the three conditions mentioned above since it will be recalled that counter 124 is counting down from the selected weight towards zero. Thus, when the count reaches 003, the weight of material in hopper 38 will be 3 pounds lighter than the desired, ordered weight.

With continued reference to FIGURE 19, switch 373 is of the progressive shorting type and comprises ten contact arms 444, 445, 446, 447, 448, 449, 450, 451, 452, and 453 which are selectively shiftable as a unit and which are connected in parallel to a switch bus 454 for successively and accumulatively engaging nine electrically independent contacts in a bank 456. The contacts in bank 456 are respectively connected in parallel through diodes 458 to readout conductors RO–0T, RO–1T, RO–2T, RO–3T, RO–4T, RO–5T, RO–6T, RO–7T, and RO–8T as shown.

Contact arms 444–453 are coupled to contact arm 416 of switch 372 for unitary movement therewith by a mechanical linkage schematically indicated at 460. When switch 372 is set to its first position where contact arm 416 connects conductor RO–0T to bus 418, all of the contact arms 444–453 are disengaged from the contacts in bank 456. When switch 372 is positioned to connect conductor RO–1T to bus 418, contact arm 444 is moved to the first contact in bank 456 to connect conductor RO–0T to bus 454. Similarly when switch 372 is positioned to connect conductor RO–2T to bus 418, arms 444 and 445 respectively connect conductors RO–1T and RO–0T to bus 454. Connection of readout conductors RO–0T through RO–8T to bus 454 is thus successively and accumulatively established.

With continued reference to FIGURE 19, switch bus 454 is connected to the anode of a diode 462 and also to a D.-C. voltage source 464 of +24 volts through a resistor 466. The cathode of diode 462 is connected to a terminal 468 which, in turn, is connected to the cathode of diode 346, to the cathode of a further diode 470, and also to ground through a resistor 472. The anode of diode 470 is connected through a terminal 471 to the base of transistor 404, resistor 408, and diode 400 as shown. As a result, it is clear that diodes 436 and 470 are in parallel with diodes 434 and 400 in a current dividing network connected between terminal 471 and resistor 440.

Thus it is clear that diodes 400 and 470 are connected to terminal 471 in a parallel OR network. This permits the establishment of a second set of acceptable conditions for turning transistor 404 on. To this end, it will be appreciated that when the hundreds decade register 132 is not at zero, a 24 volt signal is fed through conductor RO–0H to bias diode 432 in such a way as to cause current from source 438 to flow through diodes 434 and 436 to ground. If the number in register 132 becomes zero, however, the readout signal reduces to 6 volts, permitting current from source 438 to flow through diode 432, thereby reducing the voltage bias on diode 470.

Similarly, when the signals applied to all of the readout conductors connected to bus 454 are at 24 volts, the bias on diodes 458 is such that current from source 464 is caused to flow to ground through resistor 472. This will apply a bias to diode 470 for opposing current flowing from source 407. When, however, the signal on any one of the readout conductors connected to bus 454 reduces to 6 volts, indicating an "on" condition for its associated counter stage, the bias of the associated diode 458 is reversed, permitting current at source 464 to flow through switch 373, thereby reducing the voltage bias applied to the anode of diode 470. Diodes 436 and 462 are therefore connected in an AND network to terminal 468.

As a consequence, it is evident that the existence of all of the following acceptable conditions will turn transistor 404 on in addition to the previously mentioned conditions:

(1) When the count in the hundreds decade is zero; and (2) When the signal applied to any one of the tens readout conductors (RO–0T through RO–8T) which is connected to bus 454 goes to six volts indicating that its associated counter stage is on.

If for example, it is desired to set the underweight limit at 23 pounds so that any weight which is up to 23 pounds lighter than the ordered weight will be acceptable, switch 370 is positioned to connect conductors RO–0, RO–1, RO–2, and RO–3 to switch bus 388 and switch 372 is positioned to connect conductor RO–2T to bus 418 so that all numbers from 020 to 023 will be acceptable for turning transistor 404 on.

To extend the range of acceptable numbers from 019 to all zeros in each decade, switch 373 will be positioned along with operation of switch 372 to connect conductors RO–0T and RO–1T to bus 454. In this position, switch 373 provides an acceptable range from 000 to 019.

With the above switch settings, a light weighing of 16 pounds will now be considered; that is, the weight received in hopper 38 after final cut-off will be 16 pounds lighter than the desired, ordered weight. Under these conditions, the number in counter 124 will be 016. Owing to the units digit 6, the conditions at terminal 398 will not be satisfied to permit transistor 404 to be turned on. However, a zero in the hundreds decade and a one in the tens decade are acceptable conditions at terminal 468 owing to the six volt signals applied by counter to readout conductors RO–1T and RO–0H. As a result, transistor 404 will be turned on.

With continued reference to FIGURE 19, switches 371, 374, and 375 together with the AND-OR circuitry is the same as that just described for switches 370, 372, and 373. Accordingly, like reference numerals suffixed with the letter *a* have been used to designate like elements in switches 371, 374, and 375 and their associated circuitry. Since operation of switches 371, 374, and 375 and their associated networks for selecting an overweight limit and for accepting or rejecting a count present in counter 124 are the same, no further description is believed to be needed. It will be appreciated that the two AND networks associated with the overweight tolerance are connected to terminal 471 in parallel with the two AND networks associated with the underweight tolerance. As a result, either an acceptable overweight or an acceptable underweight will turn transistor 404 on.

As shown in FIGURE 19, the emitter of transistor 404 is connected to D.-C. voltage source 480 of +12 volts, and the collector of transistor 404 is connected to ground through a voltage divider network comprising a pair of resistors 482 and 484 in series. A silicone controlled current conducting switch 486 has its cathode connected to ground and its cathode gate connected to the common terminal between resistors 482 and 484. The anode and anode gate of switch 486 is connected to one coil terminal of relay R3. The other coil terminal of relay R3 is connected through the normally open set of timer contacts DST–1 to a D.-C. voltage source of +24 volts. An arc suppression diode 490 is shunted across the operating coil of relay R3 as shown.

Operation of switch 486 is similar to that of switch 359 in that it will lock in its "on" condition if contacts DST–1 are closed. Thus, relay R3 and switch 486 cannot be operated when contacts DST–1 are open. When transistor 404 is turned on, current at source 480 flows through resistor 482 to the cathode gate of switch 486 to turn switch 486 on if contacts DST–1 are closed. By turning switch 486 on, a circuit is completed for energizing relay R3 if contacts DST–1 are closed. Relay R3 actuates contacts to be described later on in circuit 326 for indicating an acceptable or non-acceptable overweight or underweight condition within the tolerance selectively set by switches 370–375. Contacts DST–1 are actuated by circuit 326 as will hereinafter appear.

*Readout circuit*

Referring now to FIGURES 20 and 20A, device 127 comprises three visual readout nixie tube units 500, 501, and 502 for the units, tens, and hundreds decades respectively. Nixie tube unit 500, as shown in FIGURE 20, comprises ten cathodes 504, 505, 506, 507, 508, 509, 510, 511, 512, and 513 which cooperate with a common plate 514 in a known manner to respectively display the digits 0, 1, 2, 3, 4, 5, 6, 7, 8, and 9 as shown. Plate 514 is connected through a resistor 516 to a D.-C. voltage source 518 of +250 volts. This nixie tube circuitry is conventional and accordingly will not be described further.

With continued reference to FIGURE 20, the circuit for cathodes 504–513 comprises a set of ten input transistors 524, 525, 526, 527, 528, 529, 530, 531, 532, and 533 having their bases respectively connected to readout conductors RO–0, RO–1, RO–2, RO–3, RO–4, RO–5, RO–6, RO–7, RO–8, and RO–9 through resistors indicated generally at 534.

As shown in FIGURE 20, the emitter and collector of transistor 524 are respectively connected to a D.-C. voltage source of +12 volts and to an input terminal 536 of a network 538. Network 538 comprises a pair of resistors 540 and 542 connected to terminal 536. The collector of transistor 524 is connected to ground through resistor 540 and to the base of a further transistor 544 through resistor 542. The emitter of transistor 544 is connected to ground, and the collector of transistor 544 is connected to source 518 through resistors 546 and 549 and also to cathode 504 as shown.

The nixie tube zero at cathode 504 is illuminated when transistor 544 is turned on to complete a circuit from cathode 504 to ground, thereby reducing the voltage on cathode 504. Current is supplied to the base of transistor 544 to turn transistor 544 on by turning transistor 524 on. Transistor 524 is turned on only when the voltage applied to its base drops below 12 volts. This occurs only when stage 140 in units register 130 is on to apply a six volt signal to readout conductor RO–0. When stage 140 is off, the signal fed through conductors RO–0 will be increased to +24 volts, thereby preventing transistor 524 from being turned on.

The switching networks illuminating the nixie tubes for the units digits 1 through 9 are the same as that just described for displaying the zero. Accordingly, like reference numerals suffixed by the associated nixie tube digits have been used to designate like elements in these other networks. As shown, the collectors of transistors 544–1, 544–2, 544–3, 544–4, 544–5, 544–6, 544–7, 544–8, and 544–9 are all connected by separate current paths through resistors 546 and 549 to source 518 and also to ground through a resistor 548.

The circuits for nixie tube units 501 and 502 are the same as that just described for unit 500. Accordingly, units 501 and 502 are illustrated only in diagrammatic form as shown in FIGURE 20A.

*Sequencing and switching circuit and operation*

Referring now to FIGURE 21, switching circuit 326 is shown in stand-by, deenergized condition and comprises a pair of conductors 560 and 562 between which a source of power is connected. To start operation, a spring-loaded, push-button start switch 562 is depressed to energize a start relay R5. This circuit may be traced from conductor 560 through closed contacts of a discharge gate limit 566, through the closed contacts of an empty balance limit switch 568, through the closed contacts of start switch 564, and through the winding 570 of relay R5 to conductor 562.

Switch 566 will be closed when discharge gate 566 is closed and will be open when gate 66 is open. Switch 568 will be closed only when scale 84 is at the normal tare point. If switch 566 is open indicating that gate 66 is open, or if switch 568 is open indicating that scale 84 is not at its normal tare point, relay R5 cannot be energized by depressing switch 564.

With continued reference to FIGURE 21, energization of relay R5 closes two sets of normally open contacts R5–1 and R5–2. Closing of contacts R5–1 establishes a holding circuit around switches 564 and 568 to maintain relay R5 energized as long as discharge gate limit switch 566 remains closed. Closing of contacts R5–2 completes circuits for energizing a weight set-up relay R6 and a slow pull-in delay feed timer DFT.

The circuit for energizing timer DFT may be traced from conductor 560, through contacts R5–2, through a set of normally closed contacts RT–1 of a slow drop out reset timer RT, and through the winding 572 of timer DFT to conductor 562. The circuit for energizing relay R6 may be traced from conductor 560, through contacts R5–2, through contacts RT–1, through a set of closed contacts DFT–1 of timer DFT, and through the winding 574 of relay R6 to conductor 562.

Energization of relay R6 closes contacts R6–1 (FIGURE 15A) for entering the weight information set up on switches 263, 265, and 267 into counter 124. Energization of relay R6 also insures that the dribble feed relay R2 and the final cut-off relay R2*c* are deenergized by opening contacts R6–2 (FIGURE 17) R6–2*c* (FIGURE 18).

After a predetermined period following energization of timer DFT and relay R6 permitting the weight information to be entered into counter 124, timer DFT times out to open contacts DFT–1, thereby deenergizing relay R6 to cause contacts R6–2 and R6–2*c* to close and contacts R6–1 to open. This conditions circuits 328 and 366 to respectively energize relays R2 and R2*a* when the selected dribble and final cut-off points are reached. By opening contacts R6–1, circuit 126 is rendered inoperative.

By timing out after a preselected delay, timer DFT closes a set of contacts DFT–2 to complete a circuit for energizing a full flow motor starter relay R7 and a dribble feed motor starter relay R8 if control switch 282 has been stepped to its first position.

As shown in FIGURE 21, control switch 282 is provided with two further decks 576 and 578. Deck 576 comprises a movable contact arm 580 which is connected to a bus 582 and which is stepped to successively engage a series of electrically independent contacts in a bank 584. As with the other decks of switch 282, bank 584 is shown to contain eleven contacts respectively represented by the position numbers 1 through 11.

With continued reference to FIGURE 21, deck 578 also has a movable contact arm 586 which is connected to a bus 588 and which is stepped to successively engage a series of electrically independent contacts in a bank 590. Like bank 584, bank 590 also contains eleven contacts respectively represented by the positions 1 through 11. Both contact arms 580 and 586 are coupled for unitary movement by linkage 290.

As shown in FIGURE 21, control switch 282 comprises the usual stepper switch network 592 which conventionally includes an operating coil connected across conductors 560 and 562 and which may also include such circuit elements as a rectifier, arc suppressor, and filter. By energizing the operating coil of network 592, contact arms 286, 286T, 286H (FIGURE 15), 339, 339T (FIG- URE 17), 339c, 339Tc (FIGURE 18), 580 and 586 (FIGURE 21), of decks 283, 284, 285, 337, 338, 337c, 338c, 576, and 578 respectively are advanced in synchronism through the eleven positions (1–11) in each of their associated contact banks. In this embodiment, as previously indicated, the positions 3–11 in each of the contact banks of decks 283, 284, 285, 337, 338, 337c, 338c, and 578 are open circuits for use if more than two materials are desired to be fed to weigh hopper 38 in a single weighing cycle. In deck 576, only positions 4–10 are open circuits and positions 3 and 11 are connected to provide a homing circuit as will presently appear.

With continued reference to FIGURE 21, it will be seen that the energizing circuit for relay R7 may be traced through contacts R5–2, through contacts RT–1, through contacts DFT–2 through normally closed contacts R2–1 of relay R2 in the dribble feed circuit 126, through contact arm 586 to the contact at the first position in bank 590, and through the winding 594 of relay R7 to conductor 562. Similarly, the energizing circuit for relay R8 may be traced through contacts R5–2, RT–1, and DFT–2, through contacts R2c–1 of relay R2c in compensation circuit 366, through contact arm 580 to the contact at the first position in bank 584, and through the winding 596 of relay R8 to conductor 562.

By energizing relay R7, contacts R7–1, R7–2, and R7–3 as shown in FIGURE 22 are closed to complete a power circuit for energizing motor 32. Similarly, the energization of relay R8, as shown in FIGURE 22, closes contacts R8–1, R8–2, and R8–3 to complete a power circuit for energizing motor 48.

Referring to FIGURES 1 and 2, solenoid 76 for actuating catch gate 73, is shown to be connected in parallel with relay R7. As a result, whenever relay R7 is energized to start motor 32, solenoid 76 is also energized to open catch gate 77. Similarly, solenoid 80, as shown in FIGURE 21, is connected in parallel with relay R8. With this circuitry, solenoid 80 is energized whenever relay R8 is energized so that catch gate 77 is opened at the same time that motor 48 is started.

As a result of starting motors 32 and 48, feeders 24 and 40 are actuated to begin delivery of the first material to weigh hopper 38. Scale 84 in sensing this weight addition causes generator 100 to produce subtract pulses for actuating counter 124. Counter 124 will thus start to count down from the selected weight which for the switch settings shown in FIGURE 15 is 248 pounds. When the selected dribble point set by switches 331 and 33T (FIGURE 17) is reached, relay R2 (FIGURE 17) is energized in the manner previously explained to cause contacts R2–1 to open, thereby interrupting the energizing circuits for solenoid 76 and relay R7. As a result, catch gate 73 will close and contacts R7–1, R7–2, and R7–3 will open to deenergize motor 32 to stop feeder 24.

Material now continues to flow into weigh hopper 38 but only from feeder 40 at the reduced dribble feed rate. When the final cut-off point set by switches 331c and 331Tc (FIGURE 18) is reached, a signal of less than six voltages is applied to the base of transistor 355c causing it to conduct current for turning switch 359c on with the result that a circuit is completed to energize relay R2c as previously explained. Usually, switches 331c and 331Tc are set for some numerical value which is greater than all zeros in counter 124 to compensate for the inherent time lags in the system as previously described. This final cut-off point may, for example, be set at 10 pounds by positioning contact arm 333Tc to connect readout conductors RO–1T to switch bus 331Tc and by positioning contact arm 333c to connect readout conductor RO–0 to switch bus 331c.

When the count of 10 appears in counter 124 with this switch setting, relay R2c will be energized to open contacts R2c–1 for deenergizing relay R8 and solenoid 80. This will stop feeder 40 and close catch gate 77 to completely interrupt the delivery of the first material to weigh hopper 38.

With continued reference to FIGURE 21, a set of contacts R2c–2 are closed by energizing relay R2c to complete an energizing circuit for a scale stabilization timer DST. This circuit may be traced from conductor 560, through contacts R5–2, RT–1, DFT–2, and R2c–2, and through operating winding 600 of timer DST to conductor 562.

After a preselected time period sufficient to permit scale 84 to stabilize, timer DST times out to close contacts DST–1 (FIGURE 19) for activating checking circuit 128. One of two conditions can now exist: first, the weight of the first material received in hopper 38 is within the acceptable over and under weight tolerances set up by switches 370–375, or second, the weight of the first material fed to hopper 38 is outside of the over and under weight range and hence is unacceptable. If the weight is acceptable, relay R3 will be energized in the manner previously explained. If, on the other hand, the weight is not acceptable, relay R3 will not be energized. The unacceptable condition will be considered near the end of this description.

Considering the acceptable condition first and referring again to FIGURE 21, energization of relay R3 (FIGURE 19) opens a set of normally closed contacts R3–1 (FIGURE 21) to prevent operation of a slow pull-in off weight alarm OWAT (FIGURE 21). Timer OWAT has an operating winding 602 connected across conductors 560 and 562 in series with contacts R3–1 and a set of contacts DST–2 of timer DST. Timer OWAT is needed as will be explained in detail later on to prevent the occurrence of a momentary false off weight signal from interrupting the feeding of the second material to hopper 38.

When energized, relay R3, as shown in FIGURE 21, closes a set of normally open contacts R3–2 for completing an energizing circuit for the operating coil in stepper switch network 592. This energizing circuit may be traced from conductor 560, through contacts R3–2, through a set of closed contacts RT–2 of timer RT, and through the operating coil of stepper switch network 592 to conductor 562. When energized, the operating coil of stepper switch network 592 operates to close a set of stepper switch interrupter contacts 606. By closing contacts 606, a circuit is completed for energizing timer RT. This circuit may be traced from conductor 560 through contacts 606, and through the operating winding 608 of timer RT to conductor 562.

Energization of timer RT immediately opens contacts RT–2 to interrupt the energizing circuit for stepper switch network 592. Also, by energizing timer RT, contacts RT–4 (FIGURE 17) and RT–5 (FIGURE 18) open immediately to reset the contacts of relays R2 and R2c. In addition to contacts RT–2, RT–4, and RT–5, contacts RT–1 also open immediately when timer RT is energized to interrupt the energizing circuits for timers DFT and DST, for relay R6, and for the motor energizing relays through switches 576 and 578. When the operating coil of stepper switch network 592 is deenergized, contacts 606 will open to interrupt the energizing circuit for timer RT. As a result, timer RT now starts to time out allowing relay R3 to reset its contacts R3–1 and R3–2, allowing timer DFT to reset its contacts DFT–1 and DFT–2, allowing relays R2 and R2c to reset their associated contacts, allowing timer DST to reset its contacts, and allowing control switch 282 to step all of its contact arms 286, 286T, 286H, 339, 339T, 339c, 339Tc, 580 and 586 to the second position in their associated contact banks. When timer RT finally times out timer DFT and relay R6 will again be energized by the closure of contacts RT–1.

With control switch now at its second position, the closing of contacts R6–1 by energizing relay R6 enters in counter 124 the weight information stored by switches 264, 266, and 268 for feeding the second material to hopper 38. Also, the dribble and final cut-off points set up by switches 332, 332T, 332c, and 332Tc will be made available to counter 124.

After the new weight information for the second material to be fed to hopper 38 has been entered in counter 124, timer DFT now times out to deenergize relay R6 with the result that contacts R6–1 (FIGURE 15) will open as previously explained. At the same time, contact R6–2 (FIGURE 17) and contacts R6–2c (FIGURE 18) will close as previously explained.

In timing out, timer DFT causes contacts DFT–2 to close to complete energizing circuits for a dribble feed motor starter relay R11 and a full flow feed motor starter relay R10. The energizing circuit for relay R10 may be traced from conductor 560, through contacts R5–2, RT–1, DFT–2, and R2–1, through switch contact arm 586 now at the second position in bank 590, and through the winding 612 of relay R10 to conductor 562. At the same time the energizing circuit for relay R11 is established through contacts R5–2, RT–1, DFT–2, and R2c–1, through contact arm 580 at the second position in bank 584, and through the winding 614 of relay R11. Energization of relay R10 closes contacts R10–1, R10–2, and R10–3 shown in FIGURE 22 to start motor 32a. Similarly, energization of relay R11 closes contacts R11–1, R11–2, and R11–3 in FIGURE 22 to start motor 48a. In addition, solenoids 76a and 80a which are connected in parallel with coils 612 and 614 will be energized simultaneously with relays R10 and R11 respectively. As a result, it is clear that feeders 60 and 62 will be started and catch gates 73a and 77a will be opened, thus permitting the delivery of the second material to weigh hopper 38.

As a result of feeding material to hopper 38, counter 124 starts to count down from the entered digit which, according to the positions of switches 264, 266, and 268 in FIGURE 15, would be 104 pounds. This count down continues at full flow rate as previously explained until the dribble point set by switches 332 and 332T in FIGURE 17 is reached. In the illustrated positions of switches 332 and 332T the dribble point will be reached when the number 22 appears in counter 124. At this point in the weighing cycle, relay R2 is energized in the manner previously explained to deenergize relay R10, thus deenergizing motor 32a and closing catch gate 73a.

Material now will be fed to hopper 38 at a reduced dribble feed rate by feeder 62, thereby causing counter 124 to continue to count down from the dribble point. When the final cut-off point is reached, relay R2c is energized in the manner previously explained. The final cut-off point may be set, for example, at seven pounds. That is, when there are 97 pounds of the second material in hopper 38, relay R2c will be energized. To accomplish this, switch arm 335c should have been previously moved to connect readout conductor RO–7 to switch 332c, and switch arm 335Tc should have been previously moved to connect readout conductor RO–0T to switch bus 332Tc. By energizing relay R2c, contacts R2c–1 will open again to de-energize solenoid 80a and relay R11 with the result that catch gate 77a will close and motor 48a will be deenergized.

Energization of relay R2c closes contacts R2c–2 to operate timer DST for allowing scale 84 to stabilize before activating checking circuit 128 as previously explained. Once timer DST times out checking circuit 128 is activated in the previously described manner to check if the weight of the second material delivered to weigh hopper 38 is within the acceptable tolerance established by the settings of switches 370–375. It will be noted that with the present invention overweight and underweight checking is simplified owing to the operation of counter 124 on the count-down basis. To this end, it is clear that only one set of selector switches establishing only one overweight limit and only one underweight limit is needed and that the weight of each material is individually and non-accumulatively checked even though there is already one or more materials already in hopper 38.

If the weight of the second material is within the acceptable tolerance, timer OWAT is momentarily pulsed. Timer OWAT does not time out since it is deenergized by the opening of contacts R3–1 upon the energization of relay R3 indicating an acceptable weighing.

Energization of relay R3 also closes contacts R3–2 to energize the operating coil of stepper switch network 592. This closes stepper switch interrupter contacts 606 as previously described to energize timer RT which immediately deenergizes the stepper switch network 592, thereby moving contact arms 286, 286T, 286H, 339, 339T, 339c, 339Tc, 580, and 586 to the third contact position in their respective contact banks. In addition, relays R2, R2c and R3 and timers DFT and DST are reset to the deenergized state.

Timer RT now times out again to energize timer DFT and relay R6 as previously explained. Upon the closing of contacts R6–1 by energizing relay R6, circuit 126 attempts to place a number in counter 124, but in the present embodiment no number is made available at the third contact position of control switch 282. As a result, timer DFT finally times out to deenergize relay R6 and to close contacts DFT–2.

Closing of contacts DFT–2 completes an energizing circuit for a home stepper relay R12 as shown in FIGURE 21. This circuit may be traced from conductor 560, through contacts R5–2, RT–1, DFT–2 and R2c–1, through contact arm 580, which is now at the third contact position in bank 584, and through the winding 616 of relay R12 to conductor 562.

When relay R12 is energized, it closes a normally open set of contacts R12–1 which establishes a holding circuit for winding 616. This holding circuit may be traced from conductor 562, through winding 616, through contacts R12–1, and through a set of normally closed off normal stepper switch contacts 618. Thus, relay R12 can only be deenergized by opening contacts 618. As will become apparent, contacts 618 will open only when contact arm 580 is stepped to the last contact position in bank 584.

Energization of relay R12, closes a second set of normally open contacts R12–2 to complete a new energizing circuit for the operating coil of stepper switch network 592. This circuit may be traced from conductor 560, through contacts 618, through a further set of normally closed interrupter stepper switch contacts 620, through contacts R12–2, and through the operating coil of network 592 to conductor 562.

Energizing the operating coil of network 592 opens contacts 620 to deenergize network 592, thereby advancing contact arms 286, 286T, 286H, 339, 339T, 339Tc, 580, and 586 to the fourth contact position in their respective contact banks. By deenergizing circuit for the operating coil of network 592, contacts 620 will close again to permit network to be reenergized. Control switch 282 will now step in this self-interrupting fashion until contact arm 580 engages the last contact in bank 584.

When switch arm 580 engages the last contact in bank 584, contacts 618 will open to interrupt the relay holding circuit through contacts R12–1, causing relay R12 to deenergize and holding contact arms 286, 286T, 286H, 339, 339T, 339c, 339Tc, 580, and 586 at the last contact position in their respective contact banks.

When contact arm 580 engages the last contact in bank 584, and when contacts RT–1 and DFT–2 close as will hereinafter appear, a circuit is completed for energizing a discharge relay R14. This circuit may be traced from conductor 560, through contacts R5–2, RT–1, DFT–2, and R2c–1, through contact arm 580 and through the winding 622 of relay R14 to conductor 562. Energization of relay R14 closes a set of normally open contacts R14–1 to complete an energizing circuit for a slow drop out discharge timer DT having an operating winding 624 connected in series with contacts R14–1 across conductors 560 and 562.

By operating timer DT, a set of contacts DT–1 are closed to complete a circuit for energizing solenoid 72 which opens discharge gate 66 to discharge the material in hopper 38. Operation of timer DT instantaneously closes a set of normally open contacts DT–2 to complete another energizing circuit for stepper switch network 592. This circuit may be traced from conductor 560, through contacts DT–2, through contacts RT–2, and through the operating coil of stepper switch network 592 to conductor 562.

As a result of energizing the operating coil of network 592, contacts 606 will close to complete an energizing circuit for timer RT. In this time, discharge gate 66 will be opening and will activate limit switch 566 to open position with the result that relay R5 will be deenergized. By deenergizing relay R5 contacts R5–1 and R5–2 will open to deactivate most of the control circuit including starter relays R7, R8, R10, and R11.

As a result of energizing relay RT, contacts RT–2 will open as previously explained to interrupt the energizing circuit for the operating coil of stepper switch network 592. This causes contacts 606 to open to interrupt the energizing circuit for timer RT which starts to time out, thereby advancing contact arms 286, 286T, 286H, 339, 339T, **339*c*, 339T*c*, 580, and 586** to the first contact position in their respective contact banks. No feeding of material will occur, however, since relay R5 will have been deenergized by the time timer RT times out.

After timer DT has timed out and limit switch 566 closes, indicating that discharge gate 66 is closed, the circuit is now reset for another feeding cycle.

The condition where a weighing is off weight and consequently not within the overweight or underweight tolerance limits set up by switches 370–375 will now be considered. For example, the weighing may be six pounds light and switches 370–375 may be set so that an underweight only up to five pounds is acceptable. Under these conditions, relay R3 will not be energized with the result that contact R3–1 remains closed to provide an energizing circuit for timer OWAT. Consequently, timer OWAT will not time out to close a set of contacts OWAT–1 after a predetermined delay to illuminate a lamp 626.

With contacts OWAT–1 closed the material in hopper 38 is required to be discharged by depressing a spring-loaded push-button switch 628 before another weighing cycle can be initiated. By depressing switch 628, a circuit is completed for energizing a relay R16. This circuit may be traced from conductor 560, through contacts OWAT–1, through switch 628, and through the winding 630 of relay R16 to conductor 562.

Energization of relay R16 closes two sets of normally open contacts R16–1 and R16–2. Closing of contacts R16–1 establishes a holding circuit around switch 628 to keep relay R16 energized when switch 628 is released. Closing of contacts R16–2 completes an energizing circuit for the operating coil of stepper switch network 592. Energization of network 592 opens contacts 620 to interrupt the energizing circuit through contacts R16–2 with the result that all the contact arms of control switch 282 will be advanced to their next contact positions in their respective contact banks. By deenergizing the operating coil of network 592, contacts 620 close to permit network 592 to be reenergized in the manner previously explained. Accordingly, control switch 282 will now step in this self-interrupting fashion until contact arm 580 engages the last contact in bank 584.

By engaging contact arm 580 with the last contact in bank 584, contacts 618 will now open to interrupt the relay holding circuit through contacts R16–1. As a result, relay R16 will be deenergized, causing contacts R16–1 and R16–2 to open. This deactivates stepper switch network 592 with all the contact arms of control switch 282 at the last contact position in their respective banks. Finally, the discharge cycle is started commencing with the energization of relay R14 as previously described to discharge the contents in hopper 38 and to reset the circuit for another weighing cycle.

With continued reference to FIGURE 21, a further spring-loaded push-button set and reset switch 632 is connected in series with switch 628 between conductors 560 and 562. By simultaneously depressing switches 628 and 632, relay R16 is energized for stepping the contact arms of control switch 282 to the first contact position in their respective contact banks. Switch 632 is used only after a power failure or during initial start up to position the contact arms of control switch 252 for a weighing cycle when no material is in hopper 38.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A material weighing apparatus comprising a weighing device, means for delivering material to be weighed to said weighing device, a counter capable of performing count down operations, means for selectively entering into said counter a numerical value representative of the weight of material desired to be delivered to said weighing device, means responsive to material delivered to said weighing device for actuating said counter to cause it to count down towards a reference value from the entered numerical value, and means under the control of said counter for interrupting the delivery of material to said weighing device in response to the entry of said reference value in said counter.

2. A material weighing apparatus comprising a weighing device, means for delivering material to said weighing device, transducer means operable by said device for producing electrical signal pulses corresponding in number to the change in weight sensed by said device, an electrical pulse operated counter connected to said transducer means and being operable in response to said signal pulses to count down from a numerical value, means for selectively entering into said counter a numerical value corresponding to the weight of material desired to be delivered to said weighing device, means for delivering material to said weighing device to produce said signal pulses for causing said counter to count down towards a reference value from the entered numerical value, and means under the control of said counter for interrupting delivery of material to said weighing device in response to the entry of said reference value in said counter.

3. The material weighing apparatus defined in claim 2 comprising overweight and underweight checking circuit means having means for selectively setting overweight and underweight limits, and means operable by said counter to provide an output signal only when the weight of material is within said limits.

4. The material weighing apparatus defined in claim 3 comprising means responsive to said output signal for resetting said counter to a second numerical value corresponding to the weight of a further material desired to be delivered to said weighing device, and means for feeding said further material to said weighing device after said second numerical value is entered in said counter.

5. In an automatic weighing apparatus having a weighing device, feed means operable to successively deliver at least two selected materials to said weighing device, transducer means operable by said weighing device for producing electrical signal pulses corresponding in number to the weight of material delivered to said weighing device, and electrically actuatable counter operatively connected to the output of said transducer means to count the pulses produced thereby, said counter being responsive to said signal pulses to count down from a numerical value entered therein, means providing information media indicating the quantities of said two materials desired to be delivered to said weighing device, means for selectively setting said counter to a first numerical value representative of the weight indicated by the information media for the first material and for actuating said feed means to deliver said first material to said weighing device thereby causing said counter to count down from said first numerical value, means under the control of said counter for cutting off delivery of said first material in response to the entry of a first reference position in said counter as it counts down from said first numerical value, means responsive to the cut-off of said first material for resetting said counter to a second numerical value corresponding to the weight indicated by said information media for the second material and for actuating said feed means to deliver said second material to said weighing device thereby causing said counter to count down from said second numerical value, and means under the control of said counter for cutting off delivery of said second material in response to the entry of a further reference position into said counter as it counts down from said second numerical value.

6. The automatic weighing apparatus defined in claim 5 comprising means for selectively and independently adjusting said reference positions for said first and second materials.

7. The automatic weighing apparatus defined in claim 5 comprising means for permitting delivery of said at least one further material only when the actual delivered weight of said first material is within a preselected tolerance of the desired weight.

8. The automatic weighing apparatus defined in claim 5 wherein said counter is a bidirectional decimal ring counter.

9. The automatic weighing apparatus defined in claim 5 wherein said feed means is operable to deliver each material at a plurality of feed rates, and wherein means are provided to automatically reduce the material feed at a selectively adjustable counter reference position before the final cut-off point is reached.

10. In an automatic weighing apparatus having a weighing device, a bidirectional pulse generator having add and subtract terminals and being operable by said weighing device to produce voltage signal pulses at said add and subtract terminals corresponding in number to the weight of material respectively removed and added with respect to said device, an electrically actuatable bidirectional decimal ring counter having at least one decade for counting the pulses produced by said generator, a plurality of controlled current conducting switches in said decade corresponding respectively to different numbers in a decimal numeral system, means providing a predetermined voltage readout signal for each of said switches when each switch is respectively rendered conductive, means for permitting only one of said switches in said decade to be conductive at one time, first circuit means responsive to a pulse signal at said add terminal for rendering the switch in said decade that is conducting nonconductive and for rendering the next succeeding switch in said decade conductive, second circuit means responsive to a pulse signal at said subtract terminal for rendering the switch in said decade that is conducting nonconductive and rendering the next preceding switch in said decade conductive, means independent of the pulses produced by said generator for rendering a selected one of said switches conductive, and feed means for delivering material to said weighing device in a continuous stream whereby said generator produces pulses at said subtract terminal to cause said counter to count down from the digit corresponding to the switch that was selectively rendered conductive.

11. In an automatic weighing apparatus having a weighing device, a bidirectional pulse generator having add and subtract terminals and being operable by said weighing device to produce voltage signal pulses at said add and subtract terminals corresponding in number to the weight of material respectively removed and added with respect to said weighing device, an electrically actuatable bidirectional decimal ring counter having a plurality of decades corresponding to different orders in a decimal numeral system for counting the pulses produced by said generator, a plurality of controlled current conducting switches in each decade corresponding to different digits in each decade, means providing first and second voltage readout signals for each of said switches when each switch is respectively rendered conductive and nonconductive, means for permitting only one of said switches in each decade to be conductive at one time, first circuit means responsive to a pulse signal at said add terminal for rendering the switch that is conducting in the lowest order decade nonconductive and for rendering the next succeeding switch in the lowest order conductive, second circuit means responsive to a pulse signal at said subtract terminal for rendering the switch that is conducting in the lowest order decade nonconductive and for rendering the next preceding switch in the lowest order decade conductive, means for transmitting carry and borrow signals at least between the switches in the lowest order decade and the switches in the next higher decade for facilitating add and subtract operations, means independent of the pulses produced by said generator for rendering a selected switch in each of said decades conductive to thereby enter a plural order digit into said counter, feed means operable after said plural order digit is entered to deliver material in a continuous stream to said weighing device whereby said generator produces pulses at said subtract terminal to cause said counter to count down from said plural order digit, and cut off means responsive to said first readout signal of a selected switch in each decade to render said feed means inoperative to deliver material to said weighing device when a count corresponding to the selected switches is reached.

12. The automatic weighing device defined in claim 11 comprising means responsive to said first readout signal associated with a selected one of said switches in each decade for reducing the flow rate at which material is delivered to said weighing device before said cut off means is rendered inoperative.

13. The automatic weighing apparatus defined in claim 11 comprising checking circuit means having means for selectively setting overweight and underweight limits corresponding to predetermined order digits, and means responsive only to the first readout signal of switches associated with digits within said limits to produce a voltage output signal.

14. The automatic weighing apparatus defined in claim 13 comprising time delay means for permitting said weighing device to stabilize after delivery of material is stopped by said cut off means before activating said checking circuit means to allow an output signal to be produced.

15. The automatic weighing apparatus defined in claim 13 comprising means responsive to said voltage output signal for selectively rendering a further switch in each decade conductive to thereby enter a further plural order digit into said counter and for rendering said feed means operative to deliver a further material to said weighing device whereby said generator produces further subtract pulses causing said counter to count down from said further plural order digit, said cut off means being responsive to selected ones of said first readout signals to render said feed means inoperative to deliver said further material.

16. In a weighing apparatus, a weighing device, means for delivering material to be weighed to said device, a movable member operatively connected to said weighing device for indicating the instantaneous load applied to said weighing device, each increment of movement of said member corresponding to a fixed predetermined multiple of weight increment to thereby provide a predetermined multiplication factor, transducer means operable by said member to produce electrical pulses in accordance with increases and decreases in the load applied to said weighing device, an electrical pulse operated bidirectional decimal ring counter having at least a units decade shift register and a tens decade shift register, said units decade shift register being operatively connected to said transducer means for counting the pulses produced thereby and including a plurality of stages respectively corresponding to predetermined numerical positions in the units decade of a plural order digit, the numbers associated with said positions having a multiplication factor corresponding to the multiplication factor associated with said movable member, an output terminal for each stage, means in each stage for applying a predetermined readout signal condition at its associated terminal to indicate the register digital position, means at each stage for changing said signal condition when the register position is shifted to another of said stages, a driver for said tens decade shift register and comprising an OR circuit having a plurality of signal input channels electrically connected one to each of the output terminals associated only with those digits requiring carry and borrow operations in the units order thereby permitting the signal condition applied to the terminals for those digits to be fed through associated ones of said input channels, a single signal output channel for said OR circuit, means in said OR circuit for producing an output signal for transmission through said output channel, means responsive to said change of readout signal condition fed to any one of said input channels to change the amplitude of said output signal, and means responsive to the change of the output signal amplitude for controlling the actuation of said tens decade register.

17. In a material weighing apparatus, a weighing device, means for delivering a selected weight of material to said weighing device, checking circuit means for determining if the actual weight of material delivered to said weighing device is within a preselected tolerance of said selected weight, said checking circuit means comprising an AND network having at least two signal input channels and a single signal output channel, means in said network for producing a voltage output signal for transmission through said output channel, a plurality of first electrically independent input terminals respectively corresponding to positions in the units decade of a plural order digit, a plurality of second electrically independent input terminals respectively corresponding to positions in the tens decade of said plural order number, means for applying first signals of like predetermined amplitudes to the one of said first terminals and to the one of said second terminals corresponding to positions in a plural order digit representing the actual weight of material delivered to said weighing device and further for applying second signals having amplitudes that differ from said predetermined amplitudes to the remaining ones of said first and second input terminals, means for selectively and accumulatively connecting said first input terminals to one of said input channels, means for connecting only a selected one of said second input terminals to the other of said input channels, means in said network for changing the amplitude of said output signal only in response to the application of said first voltage signals to one of the first input terminals connected to said one input channel and to the one of said second input terminals connected to said other input channel, and an electrical device associated with said network and being operable by changing the amplitude of said output signal.

18. In a material weighing apparatus, a weighing device, means for delivering a selected weight of material to said weighing device, transducer means operable by said weighing device to produce electrical pulses in accordance with changes in the load applied to said weighing device, an electrical pulse operated counter operatively connected to said transducer means for counting the pulses produced thereby, said counter having at least a units order register, a tens order register, and a hundreds order register, output terminal means for each register, means in said counter for applying signal conditions to the output terminal means of said registers for indicating the positions of said registers, a checking circuit for determining if the actual weight of material is within a predetermined tolerance of said selected weight, said checking circuit comprising an AND network having a plurality of signal input channels respectively connected to the terminal means of said units decade register, said tens decade register, and said hundreds decade register, a single output signal channel for said AND network, means in said circuit for producing an output signal for transmission through said output channel, means in said network for selectively adjusting at least the units order of the tolerance limit by which the actual delivered weight may vary from said selected weight, said circuit having means responsive to the application of predetermined signal conditions at said terminal means associated with each of said input channels for changing the amplitude of said output signal, and an electrical device electrically connected to said output channel and being operable by said change of output signal amplitude.

19. In an automatic weighing apparatus, a scale having a material receiver and a member movable in response to changes in load applied to said receiver to indicate by its position the instantaneous weight of material applied to said receiver, feed means operable to separately deliver at least two materials in continuous streams to said receiver, a bidirectional incremental encoder operable by said member to produce electrical pulses in accordance with changes in load applied to said receiver, an electrical pulse operated bidirectional decimal ring counter operably connected to said encoder for counting the pulses produced thereby, said counter being so responsive with respect to load changes applied to said receiver that it counts down in response to encoder pulses produced by load increases and counts up in response to encoder pulses produced by load decreases, weight selection circuit means activatable to separately enter into said counter at least first and second numerical values respectively corresponding to selected weights of said two materials desired to be delivered to said receiver, means for selectively activating said weight selection circuit means to set said counter to said first numerical value and for actuating said feed means to deliver a first of said two materials, thereby causing said counter to count down from said first numerical value, means in said counter providing readout signal conditions for indicating the counter position, material cut-off circuit means responsive to said signal conditions for producing an output signal when said counter reaches a preselected position in counting down from said first numerical value, means responsive to said output signal for rendering said feed means inoperative to thereby interrupt delivery of said first material to said receiver, means responsive to a predetermined condition for activating said weight selection circuit means to automatically set said counter to said second numerical value after delivery of said first material is interrupted and for activating said feed means to deliver the second of said two materials to said receiver, thereby causing said counter to count down from said second numerical value, said cut-off circuit means being operable to produce said output signal for rendering said feed means inoperative to deliver the second material in response to a counter readout signal condition corresponding to a further preselected counter position as said counter counts down from said second numerical value.

20. A weighing apparatus comprising a receptacle and means for sequentially weighing out preselected weights of a plurality of materials in said receptacle comprising an electrical pulse counter operable to perform count-down operations, means for sequentially entering into said counter nonaccumulative numerical values respectively corresponding to the preselected weights of said materials to be delivered to said receptacle, means for sequentially delivering said materials to said receptacle, transducer means responsive to load accumulation in said receptacle for digitally producing electrical pulses proportional in number to the change in weight in said receptacle, said counter being responsive to said pulses to sequentially count down from each of said numerical values to preselected reference values respectively associated with the materials being delivered to said receptacle, and means under the control of said counter for interrupting delivery of each material to said receptacle in response to the entry in said counter of the reference value associated with each material.

References Cited by the Examiner

UNITED STATES PATENTS

| | | | |
|---|---|---|---|
| 2,519,184 | 8/1950 | Grosdoff | 235—132 X |
| 2,595,519 | 5/1952 | Geohegan | 235—92 |
| 2,656,109 | 10/1953 | Lindars | 177—132 |
| 2,664,557 | 12/1953 | Sargrove | 177—210 X |
| 2,784,874 | 3/1957 | Harper | 235—132 X |
| 2,801,819 | 8/1957 | Lindars | 177—70 |
| 2,802,627 | 8/1957 | Crabtree | 235—132 |
| 2,858,985 | 11/1958 | Blaser | 235—132 |
| 2,871,399 | 1/1959 | Scuitto | 235—132 |
| 2,956,745 | 10/1960 | Cromleigh | 235—92 |
| 2,956,748 | 10/1960 | Weissman | 235—132 |
| 3,004,617 | 10/1961 | Brudick et al. | 177—80 X |
| 3,021,450 | 2/1962 | Jiu | 235—160 X |
| 3,035,648 | 5/1962 | Williams | 177—70 |
| 3,133,604 | 5/1964 | Gardner | 177—70 X |

OTHER REFERENCES

Manley, John C. and Buckley, Elery F., Neon Diode Ring Counter in Electronics, pages 84–87. January 1950.

LOUIS J. CAPOZI, *Primary Examiner.*

LEO SMILOW, G. J. PORTER, *Assistant Examiners.*